United States Patent
Wieler et al.

(10) Patent No.: US 9,870,556 B2
(45) Date of Patent: Jan. 16, 2018

(54) SPLIT TENDER IN A PREPAID ARCHITECTURE

(71) Applicant: GOOGLE INC., Mountain View, CA (US)

(72) Inventors: Bobby Wieler, New York, NY (US); Harry Lee Butler, IV, New York, NY (US); Colin Fleming, Barcelona (ES)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/140,881

(22) Filed: Dec. 26, 2013

(65) Prior Publication Data
US 2014/0351072 A1    Nov. 27, 2014

Related U.S. Application Data

(60) Provisional application No. 61/826,475, filed on May 22, 2013.

(51) Int. Cl.
*G06G 1/12* (2006.01)
*G06Q 20/00* (2012.01)
(Continued)

(52) U.S. Cl.
CPC ........... *G06Q 20/202* (2013.01); *G06Q 20/22* (2013.01); *G06Q 20/28* (2013.01); *G06Q 20/40* (2013.01);
(Continued)

(58) Field of Classification Search
CPC ...... G06Q 20/00–20/40; G06Q 20/105; G06Q 30/00–30/05; G06Q 40/00; G06Q 10/00;
(Continued)

(56) References Cited

U.S. PATENT DOCUMENTS 6,341,353 B1    1/2002   Herman et al.
7,502,760 B1    3/2009   Gupta
(Continued)

FOREIGN PATENT DOCUMENTS

WO    2008005018 A2    1/2008
WO    2014/190212 A1   11/2014

OTHER PUBLICATIONS

Park, "International Search Report and Written Opinion issued in International Application PCT/US2014/039246", dated Oct. 10, 2014, 1-12.
(Continued)

*Primary Examiner* — Olusegun Goyea
(74) *Attorney, Agent, or Firm* — Johnson, Marcou & Isaacs, LLC

(57) ABSTRACT

A method for maintaining a prepaid payment system comprises a user account that can be utilized to complete a purchase transaction with a merchant. A delayed processing window is introduced between a time when the merchant receives a payment approval notification from the payment system and a time when the payment system transmits a payment request to an issuer of a funding account associated with the user's payment system account. The payment system utilizes a user's stored value account maintained by the payment system to satisfy the requirements of a prepaid program, and therefore processes the payment request received from the merchant and transmits the payment approval notification without obtaining prior authorization from the issuer of the funding account. The payment system submits one or more payment requests for the funding transaction at a time after the completion of the purchase transaction between the user and the merchant.

20 Claims, 23 Drawing Sheets

(51) Int. Cl.
  *G06Q 30/00* (2012.01)
  *G06Q 20/20* (2012.01)
  *G06Q 20/40* (2012.01)
  *G06Q 20/22* (2012.01)
  *G06Q 20/28* (2012.01)
  *G06F 17/30* (2006.01)
  *G06Q 40/00* (2012.01)
  *G06F 21/00* (2013.01)
  *G06Q 20/10* (2012.01)

(52) U.S. Cl.
  CPC .......... *G06Q 20/405* (2013.01); *G06F 17/30* (2013.01); *G06F 21/00* (2013.01); *G06Q 20/105* (2013.01); *G06Q 40/00* (2013.01)

(58) Field of Classification Search
  CPC ........ G06Q 10/06; G06Q 20/04; G06Q 30/06; G06Q 20/042; G06Q 20/4014; G06F 17/30; G06F 21/00; G06F 21/24; G06F 15/16
  USPC ..... 705/14.1, 14.35–14.38, 14.17, 14.21, 30, 705/44, 49, 70, 39, 21, 7.28, 35, 318, 38, 705/45; 707/781; 455/407
  See application file for complete search history.

(56) References Cited

U.S. PATENT DOCUMENTS

| | | | | |
|---|---|---|---|---|
| 7,571,468 | B1* | 8/2009 | Williams | G06F 21/34 713/184 |
| 7,873,566 | B1* | 1/2011 | Templeton | G06Q 20/042 705/35 |
| 9,715,689 | B1 | 7/2017 | Ellis et al. | |
| 2002/0103753 | A1* | 8/2002 | Schimmel | G06Q 20/04 705/39 |
| 2005/0080692 | A1* | 4/2005 | Padam | G06Q 20/04 705/30 |
| 2005/0251446 | A1 | 11/2005 | Jiang et al. | |
| 2005/0269398 | A1* | 12/2005 | Robinson | G06Q 20/105 235/380 |
| 2006/0178986 | A1* | 8/2006 | Giordano | G06Q 20/04 705/40 |
| 2007/0156581 | A1* | 7/2007 | Imrey | G06Q 20/02 705/39 |
| 2007/0250440 | A1 | 10/2007 | Paulsen et al. | |
| 2007/0260509 | A1* | 11/2007 | Hines | G06Q 30/02 705/14.27 |
| 2008/0015987 | A1* | 1/2008 | Ramavarjula | G06Q 20/10 705/44 |
| 2008/0040275 | A1 | 2/2008 | Paulsen et al. | |
| 2008/0255898 | A1* | 10/2008 | Kuroda | G06Q 10/0635 705/7.28 |
| 2008/0313047 | A1* | 12/2008 | Casares | G06Q 20/10 705/17 |
| 2008/0319914 | A1* | 12/2008 | Carrott | G06Q 20/02 705/75 |
| 2009/0048885 | A1* | 2/2009 | Bishop | G06Q 10/0635 705/7.28 |
| 2009/0063312 | A1* | 3/2009 | Hurst | G06Q 20/105 705/30 |
| 2009/0065572 | A1* | 3/2009 | Jain | G06K 19/07739 235/379 |
| 2009/0090783 | A1* | 4/2009 | Killian | G06Q 20/0855 235/492 |
| 2009/0192913 | A1* | 7/2009 | Saito | G06Q 20/20 705/26.1 |
| 2009/0228336 | A1* | 9/2009 | Giordano | G06Q 20/04 705/75 |
| 2009/0265241 | A1* | 10/2009 | Bishop | G06Q 20/02 705/14.38 |
| 2009/0265249 | A1* | 10/2009 | Bishop | G06Q 20/02 705/21 |
| 2009/0265250 | A1* | 10/2009 | Bishop | G06Q 20/02 705/21 |
| 2009/0271262 | A1* | 10/2009 | Hammad | G06Q 20/04 705/14.33 |
| 2009/0271277 | A1* | 10/2009 | Bishop | G06Q 20/02 705/21 |
| 2009/0271278 | A1* | 10/2009 | Bishop | G06Q 20/02 705/21 |
| 2009/0287564 | A1* | 11/2009 | Bishop | G06Q 20/02 705/14.38 |
| 2009/0287565 | A1* | 11/2009 | Bishop | G06Q 20/02 705/14.38 |
| 2009/0289106 | A1* | 11/2009 | Bishop | G06Q 20/02 235/379 |
| 2009/0299841 | A1* | 12/2009 | Bishop | G06Q 20/02 705/14.21 |
| 2010/0010906 | A1* | 1/2010 | Grecia | G06Q 20/102 705/21 |
| 2010/0057553 | A1* | 3/2010 | Ameiss | G06Q 20/387 705/14.32 |
| 2010/0057614 | A1 | 3/2010 | Rainey et al. | |
| 2010/0125495 | A1* | 5/2010 | Smith | G06Q 20/3223 705/14.23 |
| 2010/0174620 | A1* | 7/2010 | Stringfellow | G06Q 20/02 705/26.1 |
| 2010/0211445 | A1 | 8/2010 | Bodington | |
| 2010/0217674 | A1* | 8/2010 | Kean | G06Q 20/204 705/17 |
| 2010/0250603 | A1* | 9/2010 | Balakrishnaiah | G06F 21/577 707/781 |
| 2010/0258620 | A1* | 10/2010 | Torreyson | G06Q 20/20 235/379 |
| 2010/0305993 | A1* | 12/2010 | Fisher | G06Q 10/0635 705/7.28 |
| 2010/0318415 | A1* | 12/2010 | Gottlieb | G06Q 20/105 705/14.17 |
| 2011/0010237 | A1* | 1/2011 | Shakkarwar | G06Q 20/04 705/14.35 |
| 2011/0022472 | A1* | 1/2011 | Zon | G06Q 20/10 705/14.64 |
| 2011/0087592 | A1* | 4/2011 | van der Veen | G06Q 20/12 705/44 |
| 2011/0180598 | A1* | 7/2011 | Morgan | G06Q 20/02 235/380 |
| 2011/0184857 | A1* | 7/2011 | Shakkarwar | G06Q 20/10 705/39 |
| 2011/0191200 | A1 | 8/2011 | Bayer et al. | |
| 2011/0215159 | A1* | 9/2011 | Jain | G06K 19/07739 235/492 |
| 2011/0251892 | A1* | 10/2011 | Laracey | G06Q 30/0253 705/14.51 |
| 2011/0288967 | A1* | 11/2011 | Selfridge | G06Q 20/00 705/30 |
| 2011/0320345 | A1* | 12/2011 | Taveau | G06Q 20/32 705/39 |
| 2012/0130787 | A1* | 5/2012 | Stouffer | G06Q 20/28 705/14.17 |
| 2012/0150728 | A1* | 6/2012 | Isaacson | G06Q 20/10 705/39 |
| 2012/0157042 | A1* | 6/2012 | McCanna | H04L 12/1414 455/407 |
| 2012/0159647 | A1* | 6/2012 | Sanin | H04L 51/32 726/28 |
| 2012/0166311 | A1 | 6/2012 | Dwight et al. | |
| 2012/0209749 | A1* | 8/2012 | Hammad | G06Q 30/06 705/27.1 |
| 2012/0239560 | A1* | 9/2012 | Pourfallah | G06Q 50/22 705/40 |
| 2012/0330787 | A1* | 12/2012 | Hanson | G06Q 20/00 705/26.41 |
| 2013/0024289 | A1* | 1/2013 | Cueli | G06Q 20/027 705/14.65 |
| 2013/0036048 | A1 | 2/2013 | Campos et al. | |
| 2013/0110604 | A1 | 5/2013 | Rooke et al. | |
| 2013/0138516 | A1* | 5/2013 | White | G06Q 20/204 705/16 |

(56) References Cited

U.S. PATENT DOCUMENTS

| | | | |
|---|---|---|---|
| 2013/0151405 A1 | 6/2013 | Head et al. | |
| 2013/0218765 A1 | 8/2013 | Hammad et al. | |
| 2013/0246260 A1* | 9/2013 | Barten | G06Q 30/06 705/41 |
| 2013/0268333 A1* | 10/2013 | Ovick | G06Q 30/0215 705/14.17 |
| 2013/0290187 A1* | 10/2013 | Itwaru | G06Q 20/3227 705/44 |
| 2014/0025457 A1 | 1/2014 | Martinez et al. | |
| 2014/0040131 A1 | 2/2014 | Andrews et al. | |
| 2014/0040145 A1 | 2/2014 | Ozvat et al. | |
| 2014/0249917 A1* | 9/2014 | Groarke | G06Q 40/10 705/14.53 |
| 2014/0351035 A1 | 11/2014 | Fish et al. | |
| 2014/0351040 A1 | 11/2014 | Kuchlein et al. | |
| 2014/0351131 A1 | 11/2014 | Wieler et al. | |
| 2014/0351132 A1 | 11/2014 | Wieler et al. | |

OTHER PUBLICATIONS

Poe, "Office Action issued in copending U.S. Appl. No. 14/140,819, filed Dec. 26, 2013", dated Jan. 14, 2015, 1-18.
Iran, "Office Action issued in copending U.S. Appl. No. 14/140,802, filed Dec. 26, 2013", dated Feb. 25, 2015, 1-16.
Long, "Office Action issued in copending U.S. Appl. No. 14/140,814, filed Dec. 26, 2013", dated Aug. 18, 2015, 1-20.
Poe, "Office Action issued in copending U.S. Appl. No. 14/140,819, filed Dec. 26, 2013", dated Aug. 6, 2015, 1-14.
Johnson, "U.S. Office Action issued in copending U.S. Appl. No. 14/140,879, filed Dec. 26, 2013", dated Nov. 27, 2015, 27 pages.
Johnson, "U.S. Office Action issued in copending U.S. Appl. No. 14/140,879, filed Dec. 26, 2013", dated Jun. 13, 2016, 34 pages.
Long, "U.S. Office Action issued in copending U.S. Appl. No. 14/140,814, filed Dec. 26, 2013", dated Feb. 10, 2016, 22 pages.
Nickitas-Etienne, "International Preliminary Report on Patentability issued in International Application No. PCT/US2014/039246", dated Dec. 3, 2015, 7 pages.
Poe, "U.S. Office Action issued in copending U.S. Appl. No. 14/140,819, filed Dec. 26, 2013", dated Jun. 15, 2016, 16 pages.
Tran, "U.S. Office Action issued in copending U.S. Appl. No. 14/140,802, filed Dec. 26, 2013", dated Sep. 9, 2015, 19 pages.
virginia.gov, "VDOT—E-ZPass", Glossary, Jun. 5, 2012, Web: https://web.archive.org/web/20120605045607/http://www.ezpassva.com/StaticPages/Dictionary.aspx?AspxAutoDetectCookieSupport=1, 2 pages.
virginia.gov, "VDOT—E-ZPass", Frequently Asked Questions, Jun. 4, 2012, Web: https://web.archive.org/web/20120604002528/http://www.ezpassva.com/StaticPages/FAQ.aspx?AspxAutoDetectCookieSupport=1, 7 pages.
Tran, "U.S. Office Action issued in copending U.S. Appl. No. 14/140,802, filed Dec. 26, 2013", dated Jul. 13, 2016, 22 pages.
Poe, "U.S. Office Action issued in copending U.S. Appl. No. 14/140,819, filed Dec. 26, 2013", dated Dec. 23, 2016, 20 pages.
Tran, "U.S. Office Action issued in copending U.S. Appl. No. 14/140,802, filed Dec. 26, 2013", dated Dec. 30, 2016, 25 pages.
Tran, "U.S. Office Action issued in copending U.S. Appl. No. 14/140,802, filed Dec. 26, 2013", dated Aug. 9, 2017, 19 pages.
Johnson, "U.S. Office Action issued in copending U.S. Appl. No. 14/140,879, filed Dec. 26, 2013", dated Jul. 25, 2017, 35 pages.
U.S. Appl. No. 14/140,802 to Butler et al. filed Dec. 26, 2013.
U.S. Appl. No. 14/140,814 to Fish et al. filed Dec. 26, 2013.
U.S. Appl. No. 14/140,819 to Wieler et al. filed Dec. 26, 2013.
U.S. Appl. No. 14/140,879 to Kuchlein filed Dec. 26, 2013.
Poe, "U.S. Office Action issued in copending U.S. Appl. No. 14/140,819, filed on Dec. 26, 2013", dated Oct. 24, 2017, 13 pages.

\* cited by examiner

320

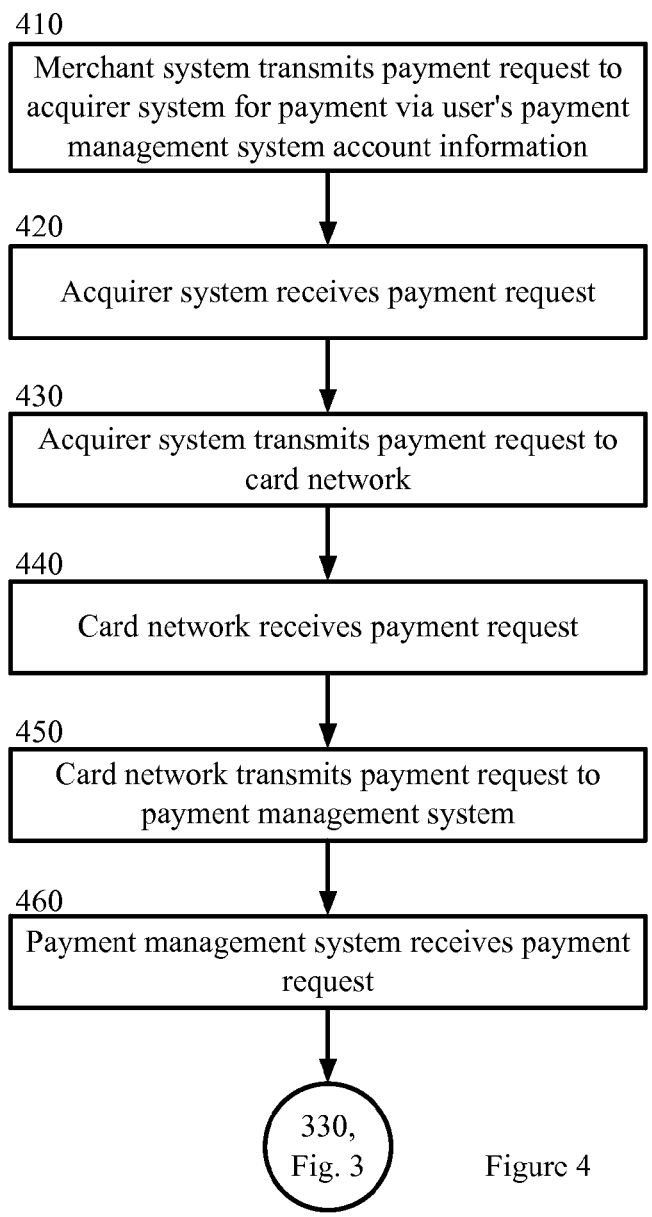

410 Merchant system transmits payment request to acquirer system for payment via user's payment management system account information 420 Acquirer system receives payment request 430 Acquirer system transmits payment request to card network 440 Card network receives payment request 450 Card network transmits payment request to payment management system 460 Payment management system receives payment request 330, Fig. 3

```
1310
┌─────────────────────────────────────────┐
│ Merchant system transmits refund request to │
│ acquirer system for refund via user's payment │
│ management system account information    │
└─────────────────────────────────────────┘
                    ↓
1320
┌─────────────────────────────────────────┐
│   Acquirer system receives refund request │
└─────────────────────────────────────────┘
                    ↓
1330
┌─────────────────────────────────────────┐
│ Acquirer system transmits refund request to │
│             card network                 │
└─────────────────────────────────────────┘
                    ↓
1340
┌─────────────────────────────────────────┐
│    Card network receives refund request  │
└─────────────────────────────────────────┘
                    ↓
1350
┌─────────────────────────────────────────┐
│ Card network transmits refund request to │
│         payment management system        │
└─────────────────────────────────────────┘
                    ↓
1360
┌─────────────────────────────────────────┐
│ Payment management system refund payment │
│                 request                  │
└─────────────────────────────────────────┘
                    ↓
                ( 1230,
                  Fig.
                   12 )
```

Figure 13

| | |
|---|---|
| User ID: User X | Merchant ID: Merchant A |
| Transaction ID: 12345xyz | MCC: 4321 |
| | Purchase Request Amount: $100 |

| Date/Time | Action |
|---|---|
| 04/05/2013 10:05:00 | Payment request for $100 received from Merchant A |

Dynamic Electronic Receipt 3010

Figure 17a

| | |
|---|---|
| User ID: User X | Merchant ID: Merchant A |
| Transaction ID: 12345xyz | MCC: 4321 |
| Offers Applied: $10 off | Purchase Request Amount: $100 |

| Date/Time | Action |
|---|---|
| 04/05/2013 10:05:00 | Payment request for $100 received from Merchant A |
| 04/05/2013 10:05:02 | Offer for $10 off purchase with Merchant A applied to purchase transaction |

Dynamic Electronic Receipt 3010

Figure 17b

User ID: User X                 Merchant ID: Merchant A

Transaction ID: 12345xyz        MCC: 4321

Offers Applied: $10 off         Purchase Request Amount: $100

Adjusted Request Amount: $90

---

Date/Time                Action

04/05/2013  10:05:00     Payment request for $100 received from
                         Merchant A 04/05/2013  10:05:02     Offer for $10 off purchase with Merchant A
                         applied to purchase transaction Dynamic Electronic Receipt 3010

Figure 18

User ID: User X          Merchant ID: Merchant A

Transaction ID: 12345xyz          MCC: 4321

Offers Applied: $10 off          Purchase Request Amount: $100

Transaction Approval Amount: $90          Adjusted Request Amount: $90

Date/Time          Action

04/05/2013 10:05:00          Payment request for $100 received from Merchant A

04/05/2013 10:05:02          Offer for $10 off purchase with Merchant A applied to purchase transaction 04/05/2013 10:05:03          Payment of $50 from Stored Value Account 04/05/2013 10:05:04          Payment authorization for $90 transmitted to Merchant A Dynamic Electronic Receipt 3010

Figure 19

| | |
|---|---|
| User ID: User X | Merchant ID: Merchant A |
| Transaction ID: 12345xyz | MCC: 4321 |
| Offers Applied: $10 off | Purchase Request Amount: $100 |
| Transaction Approval Amount: $90 | Adjusted Request Amount: $90 |

| Date/Time | Action |
|---|---|
| 04/05/2013 10:05:00 | Payment request for $100 received from Merchant A |
| 04/05/2013 10:05:02 | Offer for $10 off purchase with Merchant A applied to purchase transaction |
| 04/05/2013 10:05:03 | Payment of $50 from Stored Value Account |
| 04/05/2013 10:05:04 | Payment authorization for $90 transmitted to Merchant A |
| 04/05/2013 10:15:02 | Payment request for $20 from Account A |
| 04/05/2013 10:15:02 | Payment request for $20 from Account B |

Dynamic Electronic Receipt 3010

Figure 20

| | |
|---|---|
| User ID: User X | Merchant ID: Merchant A |
| Transaction ID: 12345xyz | MCC: 4321 |
| Offers Applied: $10 off | Purchase Request Amount: $100 |
| Transaction Approval Amount: $90 | Adjusted Request Amount: $90 |

| Date/Time | Action |
|---|---|
| 04/05/2013 10:05:00 | Payment request for $100 received from Merchant A |
| 04/05/2013 10:05:02 | Offer for $10 off purchase with Merchant A applied to purchase transaction |
| 04/05/2013 10:05:03 | Payment of $50 from Stored Value Account |
| 04/05/2013 10:05:04 | Payment authorization for $90 transmitted to Merchant A |
| 04/05/2013 10:15:02 | Payment request for $20 from Account A |
| 04/05/2013 10:15:02 | Payment request for $20 from Account B |
| 04/05/2013 10:15:05 | Payment declined for $20 from Account A |

Dynamic Electronic Receipt 3010

Figure 21

| | |
|---|---|
| User ID: User X | Merchant ID: Merchant A |
| Transaction ID: 12345xyz | MCC: 4321 |
| Offers Applied: $10 off | Purchase Request Amount: $100 |
| Transaction Approval Amount: $90 | Adjusted Request Amount: $90 |

| Date/Time | Action |
|---|---|
| 04/05/2013 10:05:00 | Payment request for $100 received from Merchant A |
| 04/05/2013 10:05:02 | Offer for $10 off purchase with Merchant A applied to purchase transaction |
| 04/05/2013 10:05:03 | Payment of $50 from Stored Value Account |
| 04/05/2013 10:05:04 | Payment authorization for $90 transmitted to Merchant A |
| 04/05/2013 10:15:02 | Payment request for $20 from Account A |
| 04/05/2013 10:15:02 | Payment request for $20 from Account B |
| 04/05/2013 10:15:05 | Payment declined for $20 from Account A |
| 04/05/2013 10:15:06 | Payment authorization for $20 from Account B |
| 04/05/2013 10:15:07 | Payment request for $20 from Account C |
| 04/05/2013 10:15:10 | Payment authorization for $20 from Account C |

Dynamic Electronic Receipt 3010

Figure 22

| | |
|---|---|
| User ID: User X | Merchant ID: Merchant A |
| Transaction ID: 12345xyz | MCC: 4321 |
| Offers Applied: $10 off | Purchase Request Amount: $100 |
| Transaction Approval Amount: $90 | Adjusted Request Amount: $90 |

| Date/Time | Action |
|---|---|
| 04/05/2013 10:05:00 | Payment request for $100 received from Merchant A |
| 04/05/2013 10:05:02 | Offer for $10 off purchase with Merchant A applied to purchase transaction |
| 04/05/2013 10:05:03 | Payment of $50 from Stored Value Account |
| 04/05/2013 10:05:04 | Payment authorization for $90 transmitted to Merchant A |
| 04/05/2013 10:15:02 | Payment request for $20 from Account A |
| 04/05/2013 10:15:02 | Payment request for $20 from Account B |
| 04/05/2013 10:15:05 | Payment declined for $20 from Account A |
| 04/05/2013 10:15:06 | Payment authorization for $20 from Account B |
| 04/05/2013 10:15:07 | Payment request for $20 from Account C |
| 04/05/2013 10:15:10 | Payment authorization for $20 from Account C |
| 05/01/2013 12:30:00 | Refund request for $20 to Account C |
| 05/01/2013 12:30:03 | Refund request for $20 to Account B |
| 05/01/2013 12:30:05 | Refund request for $50 to Stored Value Account |

Dynamic Electronic Receipt 3010

Figure 23

SPLIT TENDER IN A PREPAID ARCHITECTURE

RELATED APPLICATION

This patent application claims priority under 35 U.S.C. § 119 to U.S. Patent Application No. 61/826,475, filed May 22, 2013 and entitled "Delayed Processing Window in a Prepaid Architecture." The entire contents of the above-identified application are hereby fully incorporated herein by reference.

TECHNICAL FIELD

The present disclosure relates generally to a payment system, and more particularly to methods and systems that allow a delayed processing window between a point-of-sale transaction authorization and a payment authorization request.

BACKGROUND

In a conventional merchant-consumer financial transaction, the user provides actual debit or credit card account information to the merchant by way of swiping the actual card, entering the actual card account number, scanning a code comprising the actual card account number, or otherwise transmitting the actual card account number to the merchant system. The merchant system's point of sale terminal or online payment process engine submits a payment request to the issuer of the account through the corresponding card network. If funds are available, the issuer sends an authorization code to the merchant system to signal approval of the payment transaction. The payment process involves a single payment request generated and submitted by the merchant system and comprising the user's actual account number. The issuer receives the payment request from the merchant's system and communicates the authorization to the merchant's system in real-time.

SUMMARY

In certain example aspects described herein, a method for maintaining a prepaid payment system comprises a payment management system that maintains an account for a user, wherein the user can utilize the account to complete a purchase transaction with a merchant system. In an example embodiment, the user can conduct a transaction using one or more financial accounts associated with a digital wallet account maintained by the payment management system in a manner that is compliant with prepaid operating regulations of the financial accounts. In this embodiment, a delayed processing window is introduced between (1) a time when the user completes the transaction with the merchant by presenting a payment management system account identifier (for example, a proxy card, a wireless "tap" of a user device, a bar code, token, or other form of account identifier) and the merchant system receives a payment approval notification from the payment management system, and (2) a time when the payment management system transmits a payment request to an issuer of the financial account associated with the payment management system account and receives a payment approval notification from the issuer.

In an example embodiment, the payment management system redeems offers selected by the user and stored in the user's payment management system account. In an example embodiment, the payment management system utilizes a user's stored value account maintained by the payment management system to satisfy the requirements of a prepaid program pursuant to any applicable operations, such as the Prepaid Operating Regulations, and therefore processes the payment request received from the merchant system and transmits the payment approval notification without obtaining prior authorization from another issuer of a funding account. In this embodiment, the user may not have a prepaid balance in the user's stored value account maintained by the payment management system when the payment request transmitted by the merchant system is approved. The payment management system submits one or more payment requests for a funding transaction via the user's one or more registered payment accounts at a time after the completion of the purchase transaction between the user and the merchant system. The payment management system maintains a dynamic electronic receipt that is updated with each action taken by the payment management system in connection with the purchase transaction and the funding transaction. In an example embodiment, the payment management system can process a return transaction by identifying the original purchase transaction and funding the refund to the financial account that corresponds to the funding transaction.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 4 is a block flow diagram depicting a method for transmitting the payment authorization request to the payment management system for a fronting transaction, in accordance with certain example embodiments.

FIG. 13 is a block flow diagram depicting a method for transmitting a refund notification to the payment management system, in accordance with certain example embodiments.

FIG. 17a is a block diagram depicting a dynamic electronic receipt comprising information received from a payment request, in accordance with certain example embodiments.

FIG. 17b is a block diagram depicting an updated dynamic electronic receipt comprising information on an offer redeemed, in accordance with certain example embodiments.

FIG. 18 is a block diagram depicting an updated dynamic electronic receipt comprising information on an updated purchase request amount, in accordance with certain example embodiments.

FIG. 19 is a block diagram depicting an updated dynamic electronic receipt comprising information on a payment from a stored value account and an adjusted transaction amount, in accordance with certain example embodiments.

FIG. 20 is a block diagram depicting an updated dynamic electronic receipt comprising information on payment requests submitted, in accordance with certain example embodiments.

FIG. 21 is a block diagram depicting an updated dynamic electronic receipt comprising information on a declination notice received, in accordance with certain example embodiments.

FIG. 22 is a block diagram depicting an updated dynamic electronic receipt comprising information on payment authorizations, in accordance with certain example embodiments.

FIG. 23 is a block diagram depicting an updated dynamic electronic receipt comprising information on refund requests, in accordance with certain example embodiments.

DETAILED DESCRIPTION OF THE EXAMPLE EMBODIMENTS

Proxy account payment systems enable users to utilize a single financial account to associate and access multiple financial accounts maintained by multiple issuers. The user receives a proxy account from a payment management system and either creates a new payment system account or associates the proxy account with the user's digital wallet account already maintained by the payment management system. The user then associates one or more financial card accounts with the proxy account. For example, the user can associate with the user's proxy card account multiple debit/credit cards maintained by multiple issuers (including the payment system operating as an issuer), stored value cards (for example, gift accounts, prepaid accounts, re-loadable transaction accounts, exchange accounts, and other forms of non-credit based value accounts), loyalty accounts or store rewards accounts, value added service accounts (for example, coupons, vouchers for prepaid offers, redemption offers, and other forms of offers), and/or other forms of financial card accounts.

The user applies the proxy account to a transaction with the merchant in a manner similar to the application of any other financial account to a transaction. The merchant forwards the payment request to an acquirer, which forwards the payment request to the payment management system (which functions as the issuer for the payment request) via a card network. The payment management system can read proxy account information from the payment request and can access the user's account associated with the proxy account. If the payment management system is the issuer of a financial account selected as the funding account, the payment system will approve or decline the transaction. If another issuer maintains the funding account, the payment management system will generate and send a new payment request to the issuer via the card network. The payment management system will receive the authorization message from the issuer via the card network if the transaction is approved. The payment management system forwards an authorization to the acquirer through the card network, which forwards the authorization to the merchant. The merchant then approves the transaction.

In the proxy account payment system, the transaction between the merchant and the user is approved after the payment management system receives approval from the issuer of the funding account indicating that the funding account has a sufficient available balance to process the transaction. The payment management system sends the payment request to the issuer in real-time with the transaction to obtain approval and to transmit the authorization to the merchant.

Example System Architectures

Turning now to the drawings, in which like numerals indicate like (but not necessarily identical) elements throughout the figures, example embodiments are described in detail.

Figure 1:
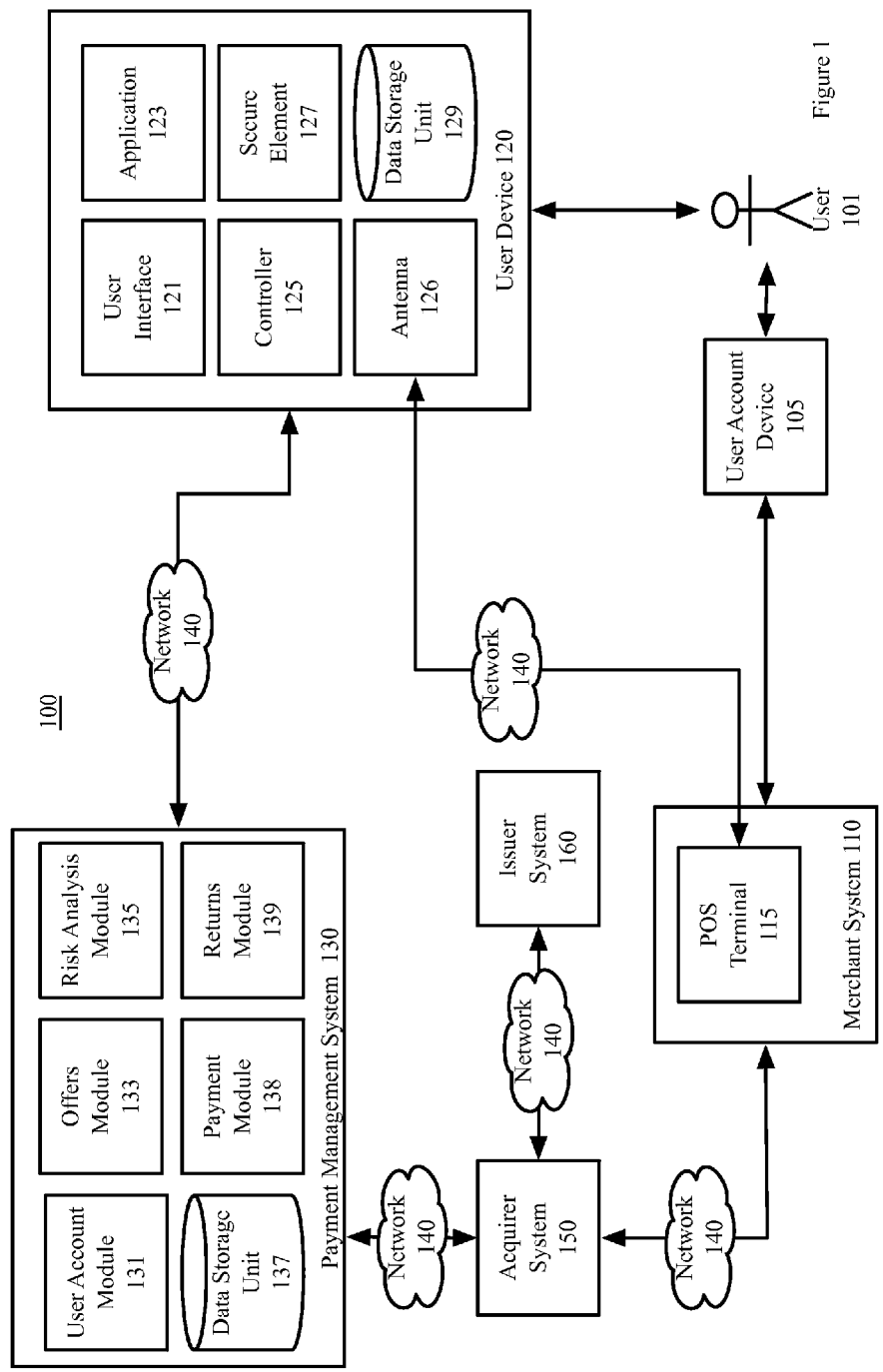
FIG. 1 is a block diagram depicting a payment system, in accordance with certain example embodiments.

FIG. 1 is a block diagram depicting a payment system, in accordance with certain example embodiments. As depicted in FIG. 1, the exemplary operating environment 100 comprises a user account device 105, a merchant system 110, a user device 120, a payment management system 130, an acquirer system 150, and an issuer system 160 that are configured to communicate with one another via one or more networks 140. In an alternative example embodiment, two or more of these systems (including systems 110, 120, 130, 150, and 160) are integrated into the same system.

Each network 140 includes a wired or wireless telecommunication means by which network systems (including systems 110, 120, 130, 150, and 160) can communicate and exchange data. For example, each network 140 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, near field communication network (NFC), any form of standardized radio frequency, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, each network system (including systems 110, 120, 130, 150, and 160) includes a device having a communication module capable of transmitting and receiving data over the network 140. For example, each network system (including systems 110, 120, 130, 150, and 160) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, point of sale device, or other appropriate technology that includes or is coupled to a web browser or other application for communicating via the network 140. In the example embodiment depicted in FIG. 1, the network systems (including systems 110, 120, 130, 150, and 160) are operated by merchants, users 101, a payment management system operator, acquirer system operator, and issuer system operator, respectively.

The merchant system 110 comprises at least one point of sale (POS) terminal 115 that is capable of processing a purchase transaction initiated by a user 101. In an example embodiment, the merchant operates an online store and the user 101 indicates a desire to make a purchase by clicking a link or "checkout" button on a website. In another example embodiment, the user device 120 is configured to perform the functions of the POS terminal 115. In this example, the user 101 scans and/or pays for the transaction via the user device 120 without interacting with the POS terminal 115.

In an example embodiment, the merchant system 110 is capable of communicating with the user device 120 via an application (not shown). The application (not shown) may be an integrated part of the POS terminal 115 or a standalone hardware device (not shown), in accordance with another example embodiment.

In an example embodiment, the user device 120 may be a personal computer, mobile device (for example, notebook, computer, tablet computer, netbook computer, personal digital assistant (PDA), video game device, GPS locator device, cellular telephone, Smartphone or other mobile device), television, or other appropriate technology that includes or is coupled to a web server, or other suitable application for interacting with web page files. The user 101 can use the user device 120 to access a payment management system 130 user account via a user interface 121 and an application 123. The application 123 is a program, function, routine, applet or similar entity that exists on and performs its operations on the user device 120. For example, the application 132 may be one or more of a shopping application, merchant system 110 application, an Internet browser, a digital wallet application, a loyalty card application, another value-added application, a user interface 121 application, or other suitable application operating on the user device 120. In some embodiments, the user 101 must install an application 123 and/or make a feature selection on the user device 120, as part of a user account, etc., to obtain the benefits of the techniques described herein.

An example user device 120 comprises a secure element 127 or secure memory, which can exist within a removable smart chip or a secure digital (SD) card or which can be embedded within a fixed chip on the device 120. In certain example embodiments, Subscriber Identity Module (SIM) cards may be capable of hosting a secure element 127, for example, an NFC SIM Card. The secure element 127 allows an application 123 resident on the device 120 and accessible by the device user 101 to interact securely with certain functions within the secure element 127, while protecting information stored within the secure element 127. The secure element 127 comprises applications running thereon that perform the functionality described herein. In an example embodiment, the secure element 127 comprises components typical of a smart card, such as crypto processors and random generators. In an example embodiment, the secure element 127 comprises a Smart MX type NFC controller in a highly secure system on a chip controlled by a smart card operating system, such as a JavaCard Open Platform (JCOP) operating system. In another example embodiment, the secure element 127 is configured to include a non-EMV type contactless smart card, as an optional implementation. The secure element 127 communicates with the application 123 in the user device 120. In an example embodiment, the secure element 127 is capable of storing encrypted user information and only allowing trusted applications to access the stored information. In an example embodiment, a controller 125 interacts with a secure key encrypted application 123 for decryption and installation in the secure element 127.

Additionally, the secure element 127 also may comprise secure software applications, such as payment applications, secure forms of the applications, authentication applications, payment provisioning applications, or other suitable application using the secure functionality of the secure element 127.

In an example embodiment, the data storage unit 129 and application 123 may be implemented in the secure element 127, as described previously, on the user device 120. In another example embodiment, the data storage unit 129, may be a separate memory unit resident on the user device 120. An example data storage unit 129 enables storage of user contact details for retrieval of a payment management system 130 account. In an example embodiment, the data storage unit 129 can include any local or remote data storage structure accessible to the user device 120 suitable for storing information. In an example embodiment, the data storage unit 129 stores encrypted information, such as HTML5 local storage.

The user device 120 also comprises a controller 125. In an example embodiment, the controller 125 is an NFC controller. In some example embodiments, the controller 125 is a Bluetooth link controller. The Bluetooth link controller may be capable of sending and receiving data, performing authentication and ciphering functions, and directing how the user device 120 will listen for transmissions from the POS terminal 115 or configure the user device 120 into various power-save modes according to the Bluetooth-specified procedures. In another example embodiment, the controller 125 is a Wi-Fi controller or an NFC controller capable of performing similar functions.

In an example embodiment, the POS terminal 115 is capable of communicating with the user device 120 using an NFC communication method. In another example embodiment, the POS terminal 115 is capable of communicating with the user device 120 using a Bluetooth communication method. In yet another example embodiment, the POS terminal 115 is capable of communicating with the user device 120 using a Wi-Fi communication method. In some example embodiments, the user 101 scans a QR code or bar code or clicks a URL link on the user device 120, which temporarily associates the user device 120 to an online merchant system 110. The POS terminal 115 queries the online merchant system 110 to link to the user device 120.

The user device 120 communicates with the POS terminal 115 via an antenna 126. In an example embodiment, once a user device application 123 has been activated and prioritized, the controller 125 is notified of the state of readiness of the user device 120 for a transaction. The controller 125 outputs through the antenna 126 a radio signal, or listens for radio signals from the POS terminal 115. On establishing a communication channel between the user device 120 and the POS terminal 115, the POS terminal 115 requests a payment processing response from the user device 120.

An example controller 125 receives a radio wave communication signal from the POS terminal 115 transmitted through the antenna 126. The controller 125 converts the signal to readable bytes. In an example embodiment, the bytes comprise digital information, such as a request for a payment processing response or a request for payment card information. The controller 125 transmits the request to the secure element 127.

In another example embodiment, the user 101 communicates with POS terminal 115 via the user account device 105. In an example embodiment, the user account device 105 looks and/or functions in the same manner as a standard credit or debit card. For example, the user account device 105 may have the user's name and/or account number listed on the front of the card. An exemplary user account device 105 can include a magnetic stripe encoding the user's payment management system 130 account information. In an example embodiment, the account information encoded in the magnetic stripe routes payment requests to the payment management system 130 for processing.

In yet another example embodiment, the user account device 105 is an account identification number, a bar code or QR code, a token, or other form of account identification or access, which may be entered manually into the POS terminal 115 or which may be captured by the POS terminal 115. The user account device 105 as discussed throughout the specification refers to a physical card as well as the other forms of account identification or access.

An example user device 120 communicates with the payment management system 130. The payment management system 130 comprises a user account module 131, offers module 133, risk analysis module 135, a data storage unit 137, a payment module 138, and a returns module 139. In an example embodiment, the user 101 creates an account with the payment management system 130. The user account module 131 manages the registration of the user 101. Regarding user account registration, the user account module 131 may generate web-based user interfaces providing forms for the user 101 to register for a payment management system 130 account. For example, the user account module 131 can collect basic user identifying information, registration information on one or more user devices 120, and payment information. In an example embodiment, the user 101 registers one or more financial accounts, including bank account debit cards, credit cards, stored value accounts, gift cards, a link to a proxy for one or more financial accounts (for example, a digital wallet link where the digital wallet is connected to other payment accounts), or other type of financial account that can be used to make a purchase, with the payment management system 130 using the user account module 131. In an example embodiment, the registered financial payment information may be used to complete a purchase by the user 101 with the merchant system 110. In an example embodiment, the user account information is stored in a user account or is otherwise associated in the data storage unit 137 with the user 101. The user may access the digital wallet account at any time to add, change or remove payment accounts. In an example embodiment, the payment management system 130 transmits limited-use proxy account information to the user device 120 enabling use of the payment accounts during a payment transaction routed to the payment management system 130 during the payment processing. For example, the proxy account number route the payment authorization request to the payment management system 130, acting as the issuer system 170 for the proxy account. In another example embodiment, the application 123 on the user device 120 may generate limited use proxy account numbers that enable the payment transaction to be routed to the payment management system 130.

An example offers module 133 receives offers from the merchant system 110 and distributes the offers to users 101 for review and selection. In another example embodiment, the offer module 133 may generate web-based user interfaces providing forms for the merchant system 110 to create offers. The offers may be prepaid offers, wherein the user 101 pays a specified amount for the offer prior to redeeming the offer with the merchant system 110. The user 101 selects the offer distributed by the offer module 133. In an example embodiment, the user 101 selects an offer by clicking on it and saving it in the user's digital wallet application 123, which may then be uploaded to the payment management system 130 and associated with the user's 101 account.

In an example embodiment, the data storage unit 137 can include any local or remote data storage structure accessible to the payment management system 130 suitable for storing information. In an example embodiment, the data storage unit 137 stores encrypted information, such as HTML5 local storage.

In an example embodiment, the user device 120 and/or user account device 105 communicate payment information to the merchant system 110 in the form of a proxy or virtual account identifier, without transmitting the user's actual account information. The user's actual account information is maintained by the payment management system 130. The merchant system 110 receives the user's 101 payment information and interacts with the acquirer system 150 (for example third party payment processing companies) to process a payment request. The user's 101 payment information routes the merchant system's 110 payment request to the payment management system 130. The payment management system 130 receives the payment request and the offers module 133 determines whether the user 101 has an offer applicable to the transaction. In an example embodiment, any offers applicable to the transaction are applied thereby reducing the transaction amount.

In an example embodiment, the risk analysis module 135 determines whether to authorize the transaction. In an example embodiment, the risk analysis module 135 performs the risk analysis and, if there is appropriately-low risk, authorizes the merchant system 110 payment request without seeking prior authorization for a payment account saved in the user's 101 payment management system 130 account. For example, the payment request is authorized based on information contained in the user's 101 payment management system 130 account and not based on receiving a payment authorization received by the issuer system 160 corresponding to the payment account.

The payment management system 130 transmits a payment authorization notification to the merchant system 110 through the acquirer system 150. The payment management system 130 then transmits the issuer system 170 (for example Bank X and other financial institutions to authorize payment) to process the payment.

In an example embodiment, the payment module 138 then determines which financial account to charge or deduct the transaction balance to. In an example embodiment, the user 101 has defined rules for determining which payment account the payment management system 130 will submit the payment request to. In an example embodiment, the user 101 has a prepaid balance in a digital wallet account maintained by the payment management system 130. In this embodiment, the payment management system 130 will deduct a portion of or the entire amount of the transaction from the prepaid balance. In an example embodiment, maintaining a sufficient prepaid balance to cover part of or all of the purchase transaction may be evaluated by the risk analysis module 135 when determining whether to authorize the purchase transaction.

In another example embodiment, the payment module 138 submits a payment request to the issuer system 160 that corresponds to the user's 101 payment account information selected to charge the transaction balance to. In yet another example embodiment, the payment module 138 may charge the transaction balance to multiple different payment accounts. In an example embodiment, the payment module 138 will receive notification of an approved payment transaction from the issuer system 160. In another example embodiment, the payment module 138 will receive notification of a declined payment transaction from the issuer system 160. In this embodiment, the payment management system 130 will log the declined transaction and the payment module 138 will submit a new payment request to the issuer system 160 for a different payment account.

In an example embodiment, the payment management system 130 logs each payment request, payment declination, and payment authorization in a dynamic transaction receipt. In an example embodiment, a receipt comprises a written record for the transaction that is presented electronically. In an example embodiment, the receipt is available for review by the user 101 in the user's payment management system 130 account.

In an example embodiment, the user 101 processes a return with the merchant system 110. In this embodiment, the return if transmitted to the payment management system 130 in a manner consistent with that of a payment request. The returns module 139 reviews the information contained in the refund request and authorizes a credit to the user's 101 corresponding payment account. In an example embodiment, the returns module 139 uses logic to determine the corresponding payment transaction and the corresponding payment account to credit the return transaction amount to. In an example embodiment, the dynamic transaction receipt is updated to include the return transaction.

Figure 2:
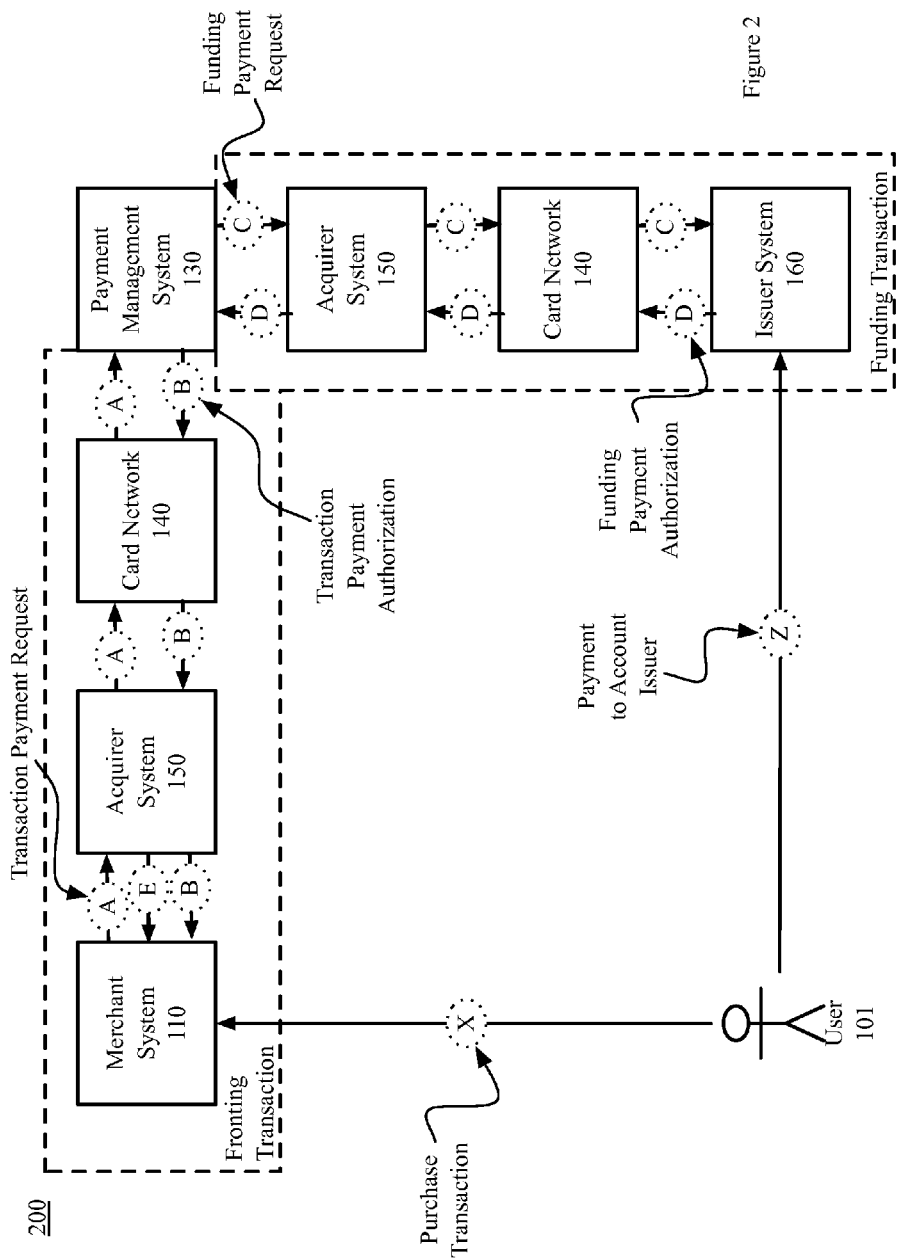
FIG. 2 is a block diagram depicting a payment flow, in accordance with certain example embodiments.

FIG. 2 is a block diagram depicting an example payment flow, in accordance with certain example embodiments. As depicted in FIG. 2, the example operating environment 200 comprises a fronting transaction and a funding transaction. In an example fronting transaction, once the user 101 initiates the purchase transaction (X) with the merchant system 110, the merchant system submits the payment request (A) and the payment management system 130 responds with the payment authorization (B). In an example embodiment, the fronting transaction is completed before the funding transaction is initiated. In an example funding transaction, the payment management system 130 initiates the payment request (C) and the issuer system 160 responds with the payment authorization (D). As depicted in FIG. 2, the user 101 settles any amount owed to the issuer system 160 in a separate payment transaction (Z) and the merchant system 110 receives the payment remittance (E) from the funding transaction.

The components of the example operating environments 100 and 200 are described hereinafter with reference to the example methods illustrated in FIGS. 3-15. The example methods of FIGS. 3-15 may also be performed with other systems and in other environments.

Example System Processes

Figure 3:
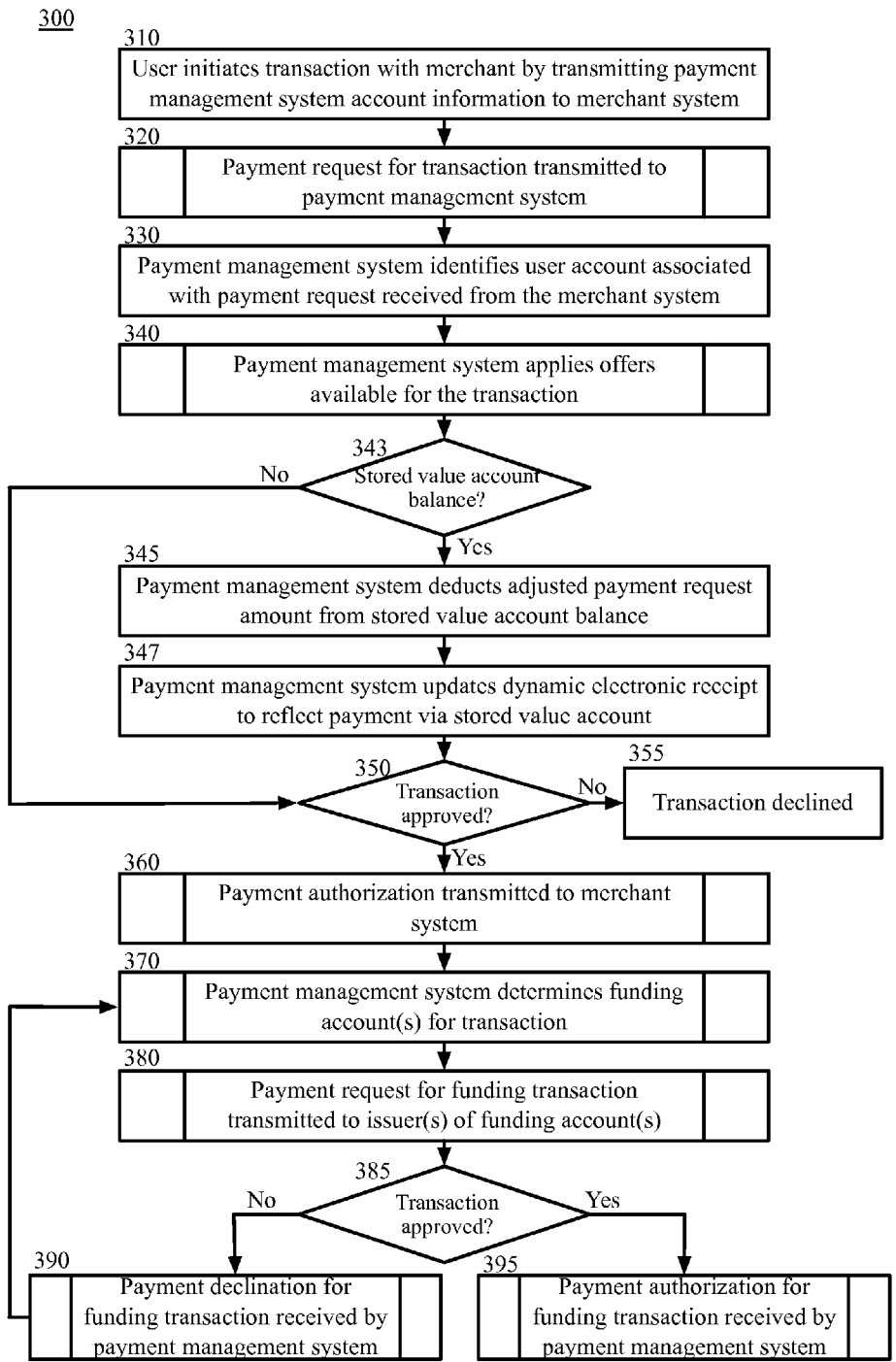
FIG. 3 is a block flow diagram depicting a method for processing a purchase transaction utilizing a delayed processing window between a point-of-sale transaction authorization and a payment authorization request, in accordance with certain example embodiments.

FIG. 3 is a block flow diagram depicting a method for processing a purchase transaction utilizing a delayed processing window between a point-of-sale transaction authorization and a payment authorization request, in accordance with certain example embodiments. The method 300 is described with reference to the components illustrated in FIGS. 1 and 2.

In an example embodiment, a payment management system 130 maintains an electronic account, such as a digital wallet account for a user 101. In an example embodiment, the user 101 accesses the payment management system 130 via a website and a network 140. In an example embodiment, the user 101 submits registration information to the payment management system 130, including, but not limited to, name, address, phone number, e-mail address, and information for one or more registered financial accounts, including bank account, debit cards, credit cards, a loyalty rewards account card, or other type of account that can be used to make a purchase (for example, card type, card number, expiration date, security code, and billing address). In an example embodiment, the user's 101 payment management system 130 account information is saved in the data storage unit 137 and is accessible to the user account module 131. In an example embodiment, the payment management system 130 account is a digital wallet account maintained by the payment management system 130 or a third party system. In another example embodiment, the user 101 may use a smart phone application 123 to register with the payment management system 130. In yet another example embodiment, the user 101 accesses the payment management system 130 via a user device application 123.

In an example embodiment, the user 101 is provided with an account identifier (for example, an account number, proxy account number, or other form of account identifier) and/or a user account device 105 (for example, a magnetic stripe card, a bar code, a QR code, or other device that may be used to complete a payment transaction with a merchant system 110) that corresponds to the user's 101 payment management system 130 account.

In block 310, the user 101 initiates a transaction with a merchant. In an example embodiment, the user 101 browses the merchant system 110 online marketplace. In this embodiment, the merchant system 110 online marketplace is an online shopping website wherein the user 101 can select and purchase items from the merchant system 110. The user 101 indicates a desire to place the item in an electronic shopping basket. In an alternative example embodiment, the user 101 has previously selected one or more items to be placed in the electronic shopping basket and has selected an additional item to be placed in the electronic shopping basket. In another alternative example embodiment, the user 101 has previously selected one or more items to be placed in the electronic shopping basket and has indicated a desire to complete the purchase by clicking a "checkout" button in the electronic shopping basket. In an example embodiment, the user 101 enters the account identifier upon checkout. In this embodiment, the user 101 enters the payment management system 130 account information in the credit card fields on the checkout page.

In another example embodiment, the merchant system online marketplace provides a link, button, or other control that allows the user 101 to automatically transmit the user's payment management system 130 account information to the merchant system 110 (for example, a "pay with digital wallet account" button). In this embodiment, the user 101 is prompted to log into, has previously logged, or is otherwise automatically logged into the payment management system 130. In another example embodiment, the user's 101 login credentials are shared across other accounts (for example, social networking websites and user device 120 accounts) and the user 101 is automatically logged into the payment management system 140 account using the shared login credentials.

In another example embodiment, the digital wallet application 123 can interact with the merchant system 110. The merchant's website can detect whether the user device 120 includes a digital wallet application 123 and attach to user's digital wallet. Once attached, the merchant system 110 can send a purchase request message to the digital wallet application 123 requesting payment information. In response to receiving a purchase request message from the merchant system 110, the digital wallet application 123 can present the user 101 with a user interface 121 for the user 101 to confirm the purchase the digital wallet application 123.

In another example embodiment, the user 101 enters a store of the merchant, selects an item for purchase, and takes the item to a point of sale device (for example, a POS terminal 115) of the merchant system 110 to purchase the item. In this embodiment, the user 101 may use the user account device 105 in a manner consistent with a magnetic stripe credit card. In another embodiment, a payment code is displayed on the user interface 121 of the user device 120 in a manner that the merchant system 110 and/or user 101 can read the code. In an example embodiment, the payment code is a bar code, QR code, or other machine-readable code that is capable of being scanned by a code scanner or otherwise readable by the merchant system 110. In another example embodiment, the payment code is displayed on the user interface 121 so that a merchant operating the merchant system 110 can read and physically enter the payment code into the POS terminal 115. In an alternative example embodiment, the payment code is read by the user 101 and entered into the POS terminal 115.

In another example embodiment, the user 101 using the user device 120 to initiate a contactless "tap" with the POS terminal 115. In operation of an NFC, Bluetooth, Wi-Fi, or other wireless transaction, the user 101 "taps" the user device 120, such as an NFC-enabled user device 120, to POS terminal 115 of a point of sale system. The POS terminal 115 recognizes the NFC-enabled device 120 when the device is moved within range of the POS terminal 115, establishes a secure communication channel with the device 120, and initiates a payment transaction between the POS terminal 115 and the device 120.

In block 320, the merchant system 110 transmits a payment request for the purchase transaction to the account management system 130. In an example embodiment, the submission of the payment request by the merchant system for the purchase transaction signifies the beginning of the fronting transaction as illustrated on FIG. 2. The payment request functions to seek approval for the purchase transaction via the account information provided by the user 101. In an example embodiment, the merchant system 110 processes the purchase transaction in a manner consistent with a typical debit card or credit card transaction. The method for transmitting the payment authorization request to the payment management system 130 for the fronting transaction is described in more detail hereinafter with reference to the methods described in FIG. 4.

FIG. 4 is a block flow diagram depicting a method 320 for transmitting the payment authorization request to the payment management system 130 for the fronting transaction, in accordance with certain example embodiments, as referenced in block 320. The method 320 is described with reference to the components illustrated in FIGS. 1 and 2.

In block 410, the merchant system 110 generates a payment request message to request payment using the account information provided by the user 101 in block 310 and transmits the payment request to an acquirer system 150. In an example embodiment, the account information resembles actual debit/credit card information and the POS terminal 115 processes the transaction in a manner consistent with a typical payment request.

In block 420, the acquirer system 150 receives the payment request. In an example embodiment, the acquirer system 150 receives the payment request in a manner consistent with a typical debit card or credit card transaction.

In block 430, the acquirer system 150 transmits the payment request to a card network 140. In an example embodiment, the acquirer system 150 transmits the payment request in a manner consistent with a typical debit card or credit card transaction. In an example embodiment, the account information provided by the user 101 in block 310 can be read and understood by the acquirer system 150, which allows the acquirer system 150 to transmit the request to the appropriate card network 140.

In block 440, the card network receives the payment request. In an example embodiment, the card network receives the payment request in a manner consistent with a typical debit card or credit card transaction.

In block 450, the card network 140 transmits the payment request to the payment management system 130. In an example embodiment, the account information provided by the user 101 in block 310 can be read and understood by the card network 140, which allows the card network 140 to transmit the request to the payment management system 130. In this embodiment, the card network 140 reads an account number from the account information and determines, based on a series of numbers or routing information contained in the account number, that the payment request should be transmitted to the payment management system 130.

In block 460, the payment management system 130 receives the payment request.

The method 320 then proceeds to block 330 in FIG. 3.

Returning to FIG. 3, in block 330, the payment management system 130 identifies the user 101 account associated with the payment request received from the merchant system 110. In an example embodiment, the payment management system 130 uses the information contained in the payment request to identify the user's 101 account. In an example embodiment, the payment management system 130 reads the user's 101 account identification information from the payment request. In an example embodiment, the user's 101 identification information is contained in or encoded by the account information. In another example embodiment, the payment management system 130 cross-references a list of generated account numbers to determine the corresponding user 101 account.

In another example embodiment, the user 101 is conducting an online transaction with the merchant system 110 or a transaction via a merchant shopping application 123 resident on the user device 120 and the user 101 is logged into the user's payment management system 130 account.

In block 340, the payment management system 130 applies any offers available for the purchase transaction. The method for applying offers is described in more detail hereinafter with reference to the methods described in FIG. 5.

Figure 5:
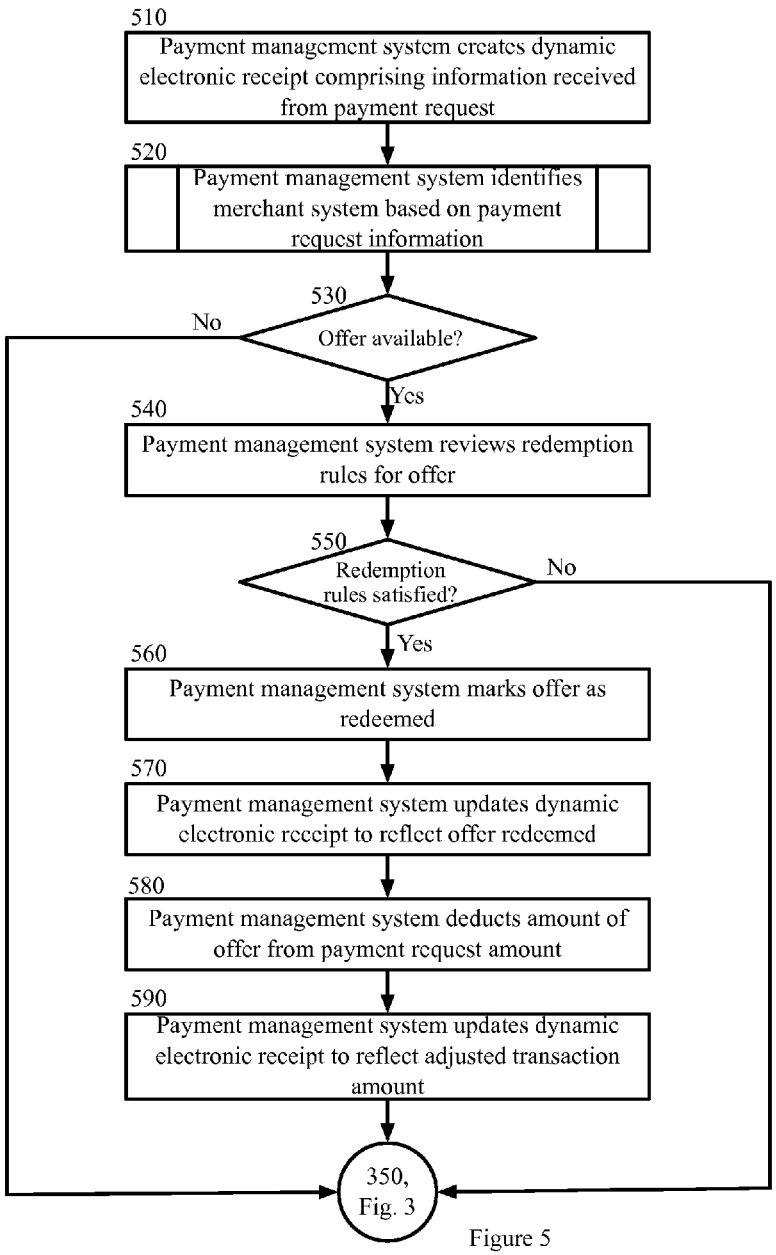
FIG. 5 is a block flow diagram depicting a method for applying offers, in accordance with certain example embodiments.

FIG. 5 is a block flow diagram depicting a method 340 for applying offers, in accordance with certain example embodiments, as referenced in block 340. The method 340 is described with reference to the components illustrated in FIGS. 1 and 2.

In an example embodiment, the payment management system 130 distributes offers online. In an example embodiment, the merchant system 110 registers with the payment management system 130 and transmits an offer to the payment management system 130 for online distribution. In an example embodiment, the offers may include, but are not limited to, coupons, loyalty points, prepaid offers, rebates, and other forms of value added services. In another example embodiment, the offers are provided by a manufacturer system (not shown) or another third party system.

In an example embodiment, the offers are for a specific product or group of products. For example, the offer may be for $1.00 off Brand A laundry detergent or $1.00 off a Brand B product. These offers may be redeemed at any merchant that accepts manufacturer coupons. In another example embodiment, the offers are for a particular merchant. For example, the offer may be for $10 off a $50 purchase at Merchant X. In an alternative example embodiment, the offers comprise loyalty reward point redemptions. For example, the offer may be for 10 loyalty points for every purchase of a Manufacturer B product.

In an example embodiment, the offers comprise details on how the offer can be redeemed and redemption rules. For example, the offer may comprise the identification of the item to be purchased, such as product title, brand information, universal product code (UPC), a stock keeping unit (SKU), a Japanese article number (JAN), a world product code (WPC), International Standard Book Number (ISBN), European Article Number (EAN), color, size, and other relevant sale information.

In an example embodiment, the merchant system 110 creates the offer outside of the payment management system 130. In an alternative example embodiment, the payment management system 130 may generate web-based user interfaces providing forms for the merchant system 110 to create offers.

In an example embodiment, the user device 120 displays the offer for the user 101 to review. In an example embodiment, the offer is displayed in an offer application 123 resident on the user device 120. In another example embodiment, the offer is displayed in response to an Internet search, in an electronic message or text message, or as a banner in an Internet browser. In an example embodiment, the user 101 selects the offer and saves it to the user's payment management system 130 account.

In block 510, the payment management system 130 creates a dynamic electronic receipt comprising the information received from the payment request. In an example embodiment, the dynamic electronic receipt is a written record for the transaction that is presented electronically. In an example embodiment, the dynamic electronic receipt comprises a listing of each action taken by the payment management system 130 with respect to the purchase transaction (including the fronting transaction and the funding transaction). In an example embodiment, the dynamic electronic receipt is saved in the data storage unit 137 and is available for review by the user 101 in the user's payment management system 130 account. FIG. 17a illustrates an example dynamic electronic receipt 3010. In this example, Merchant A transmitted a payment request for $100 to the payment management system 130 for a purchase transaction between Merchant A and User X.

Returning to FIG. 5, in block 520, the payment management system 130 identifies the merchant system 110 based on the information contained in the payment request. In an example embodiment, the payment management system 130 maintains a database of known merchant systems 110 and the corresponding merchant identification (ID) codes or merchant description information (for example, merchant name, address, phone number, franchise name or location, franchisee/owner name, franchisee/branch number, and other identifying information). The method for identifying the merchant system 110 from the payment authorization request for the fronting transaction is described in more detail hereinafter with reference to the methods described in FIG. 6a.

FIG. 6a is a block flow diagram depicting a method 520 for identifying the merchant system 110 from the payment authorization request for the fronting transaction, in accordance with certain example embodiments, as referenced in block 520. The method 520 is described with reference to the components illustrated in FIGS. 1 and 2.

In block 610, the payment management system 130 reads the payment request. In an example embodiment, the information required to identify the merchant system 110 can be obtained from the payment request and cross-referenced to the database of known merchant systems 110.

In block 620, the payment management system 130 determines whether the merchant ID code is available on the payment request. In an example embodiment, the payment management system 130 reads the merchant ID code from the payment request and cross-references the code to the merchant ID codes of known merchant systems to identify the merchant system 110.

In an example embodiment, the merchant system 110 has previously provided the payment management system 130 with a merchant's identification (ID) (for example, when registering with the payment management system 130, when providing the payment management system 130 offers for distribution, or when otherwise conducting business with the payment management system 130).

If the merchant ID code is available, the method 520 proceeds to block 630. In block 630, the payment management system 130 compares the merchant ID code provided in the payment request to the merchant ID code provided in the offers saved in the user's 101 payment management system 130 account. In an example embodiment, the merchant system 110 created the offers for distribution by the payment management system 130 and provided the merchant ID codes for inclusion on the offers when they were created.

Figure 6:
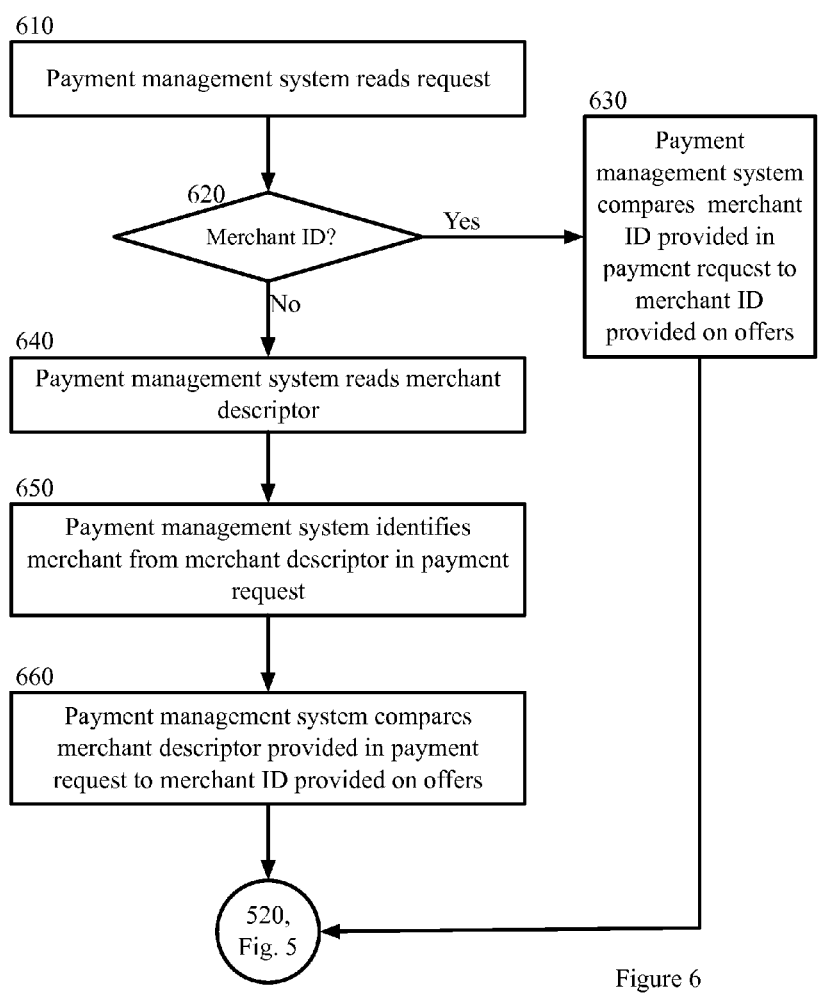
FIG. 6 is a block flow diagram depicting a method for identifying a merchant system from the payment authorization request for the fronting transaction, in accordance with certain example embodiments.

From block 630 in FIG. 6, the method 520 proceeds to block 530 in FIG. 5.

Returning to block 620, if the payment request does not contain the merchant ID, the method 520 proceeds to block 640.

In block 640, the payment management system 130 reads a merchant descriptor from the payment request. In an example embodiment, the payment request comprises a descriptor that identifies the merchant system 110, for example, a name, address, location, phone number, franchisee name/location, owner name, or other descriptor that identifies the merchant system 110. In an example embodiment, the descriptor can comprise an identification of a branch, franchise, or division of a merchant system (for example, a fast food restaurant franchise located on street X in town Z).

In block 650, the payment management system 130 identifies the merchant system 110 based on the merchant descriptor read from the payment request in block 640. In an example embodiment, the payment management system 130 compares the merchant descriptor (for example, an address, name, phone number, franchise name, franchise location, franchisee name or owner name, and franchisee or branch number) to a known merchant system. In an example embodiment, the payment management system 130 matches the merchant descriptor to a known merchant identifier. In another example embodiment, the payment management system 130 uses a merchant type identifier (for example, a merchant category code or MCC) to aid in the identification of the merchant system 110. For example, the payment management system 130 can distinguish between different merchant systems 110 with similar names using the MCC. In yet another example, the payment management system 130 uses the acquirer system 150 name to aid in the identification of the merchant system 110. For example, the all Merchant X stores use Acquirer B as the acquirer system 150.

In block 660, the payment management system 130 compares the merchant descriptor and/or merchant system 110 identified in block 650 to the merchant ID code and/or merchant descriptor provided in the offers. In an example embodiment, payment management system 130 cross-references the merchant system 110 information and the offers saved in the user's 101 payment management system 130 account.

The method 520 then proceeds to block 530 in FIG. 5.

Returning FIG. 5, in block 530, the payment management system 130 determines whether the user 101 has offers available to the purchase transaction. In an example embodiment, one or more of the offers are applicable to a transaction with a specific merchant system 110. In an alternative example embodiment, the offer is provided by the payment management system 130 and is applicable to a transaction with any merchant system 110.

If no offers are available, the method 340 proceeds to block 350 in FIG. 3.

Returning to block 530 in FIG. 5, if offers are available, the method 340 proceeds to block 540 in FIG. 5.

In block 540, the payment management system 130 reviews the redemption rules for the offer. In an example embodiment, each offer will have one or more rules or conditions associated with it that the payment management system 130 can understand without human intervention. These rule include, but are not limited to a purchase threshold (for example, receive $1.00 off Brand Z laundry detergent that is regularly priced $5.00 or more, or $10 single purchase of more than $50 from Merchant X), an aggregate purchase threshold (for example, receive $10 off next purchase from a merchant after the accumulated purchase of Manufacturer B products has reached $100), a minimum number of purchases of an item (for example, receive $10 off your tenth purchase of Brand Z items), a time restriction (for example, receive $10 off a lunch-time purchase), a maximum discount (for example, the merchant system 110 sets $10 off as a maximum and user A gets $1 off, while user B gets $2 off), and/or a location restriction (for example, receive $10 off a purchase at a specified location). In an example embodiment, these rules are set by the merchant system 110 at the time the offer is created and reviewed before the offer is applied. In an alternative example embodiment, the offer is a prepaid offer and the redemption rules may include an expiration date. The offer content and discount may be personalized to a particular user. For example, user A may receive a 5% off coupon for a particular product or service while user B may receive a 10% off coupon for the same product or service. The payment management system 130 may distribute the offers and selectively send potential offers to the user 101. The payment management system 130 may determine which users qualify for a particular offer. The payment management system 130 may also rank and prioritize the offers sent to a user 101.

In block 550, the payment management system 130 determines whether the redemption rules are satisfied by the purchase transaction. In an example embodiment, the payment management system 130 reviews the terms of the offer and the payment request to determine which of the offers are applicable to the purchase transaction.

If no offers are applicable to the purchase transaction, the method 340 proceeds to block 350 in FIG. 3.

Returning to block 550 in FIG. 5, if offers are applicable to the purchase transaction, the method 340 proceeds to block 560. In an example embodiment, more than one offer may be applied to the purchase transaction. In another example embodiment, only one offer may be applied to the purchase transaction. In this embodiment, the payment management system 130 may determine which offer provides the user 101 with the greatest savings.

In block 560, the payment management system 130 marks the offer as redeemed. In an example embodiment, after the offer is marked as redeemed it is not available for redemption during a different payment transaction.

In block 570, the payment management system 10 updates the dynamic electronic receipt to reflect the redemption of the offer. In an example embodiment, the user 101 is notified of the redemption of the offer in real-time (for example, notification is transmitted via electronic mail, SMS, or other form of communication). In an example embodiment, the user 101 is provided with a copy of the dynamic electronic receipt (for example, a copy is sent via electronic mail, a link to the dynamic electronic receipt is provided, a notification is transmitted indicating that the dynamic electric receipt was updated, or other form of notification is provided). Continuing with the previous example illustrated in FIG. 17b, an offer for $10 off a purchase with Merchant A was applied to the transaction between User X and Merchant A and the dynamic electronic receipt 3010 was updated to reflect the redemption of the offer.

Returning to FIG. 5, in block 580, the payment management system 130 deducts the amount of the offer from the payment request amount. In an example embodiment, the payment management system 130 calculates an adjusted transaction amount after each offer is applied.

In block 590, the payment management system updates the dynamic electronic receipt to reflect the adjusted transaction amount. Continuing with the previous example illustrated in FIG. 18, the payment management system 130 deducted the $10 value of the offer from the $100 purchase request amount to calculate the $90 adjusted request amount and the dynamic electronic receipt 3010 was updated to reflect the adjusted transaction amount.

Returning to FIG. 5, the method 340 continues to block 345 in FIG. 3.

Returning to FIG. 3, in block 343, the payment management system 130 determines whether the user 101 has a stored value account balance. In an example embodiment, the user's 101 stored value account is a prepaid account maintained by the payment management system 130, as described with reference to block 350 in FIG. 3.

If the user 101 does not a have a stored value account balance, the method 300 proceeds to block 350 in FIG. 3.

Returning to block 343, if the user 101 has a stored value account balance, the method 300 proceeds to block 345.

In block 345, the payment management system 130 deducts the adjusted payment request amount from the stored value account balance. In an example embodiment, the payment management system 130 is the issuer system 160 for the stored value account. In another example embodiment, the stored value account is maintained by a third party issuer system 160 and the payment management system 130 deducts the balance from the stored value account by submitting a payment request as described herein with reference to block 380 in FIG. 3.

In block 347, the payment management system updated the dynamic electronic receipt to reflect payment for the funding transaction via the stored value account. Continuing with the previous example as illustrated in FIG. 19, $50 of the transaction balance ($90) was deducted from the stored value account and the dynamic electronic receipt 3010 was updated to reflect the payment from the stored value account.

Returning to FIG. 3, in block 350, the payment management system 130 determines whether to approve the payment request. In an example embodiment, the payment management system 130 executes an algorithm, a logic program, or otherwise determines whether to approve the payment request without receiving notification of an approved funding transaction. For example, the payment management system 130 may evaluate factors (such as whether the user 101 has a positive stored value account balance) to determine whether to approve the payment request without obtaining prior approval for the funding transaction from an issuer system 160 corresponding to a funding account designated by the user 101.

In an example embodiment, the user 101 is prompted to establish a stored value account when creating and/or updating the user's 101 payment management system 130 account. An example stored value account comprises a prepaid account maintained by the payment management system 130. In an example embodiment, the user 101 designates the stored value account as a preferred account to deduct any payment requests for purchase transaction from. In an example embodiment, the user 101 is prompted or otherwise notified to "top off" or add funds when the stored value account reaches a designated value. In an example embodiment, the stored value account may be funded by any credit account, debit account, bank account, or financial account. In another example embodiment, funds may be added to the stored value account using a pay by electronic mail transaction, gift card, or offer redemption transaction.

If the transaction is not approved, the method 300 proceeds to block 355. In block 355, the transaction is declined and the payment management system 130 transmits a notice of the declined transaction to the merchant system 110.

Returning to block 350, if the transaction is approved, the method 300 proceeds to block 360. In block 360, the payment management system 130 transmits a payment authorization message to the merchant system 110. In an example embodiment, the payment authorization message is transmitted comprises an authorization for the amount in the payment request less the value of any offers applied. In an example embodiment, the payment authorization is processed in a manner consistent with a typical debit card or credit card transaction. The method for method for transmitting the payment authorization to the merchant system 110 for the fronting transaction is described in more detail hereinafter with reference to the methods described in FIG. 7.

Figure 7:
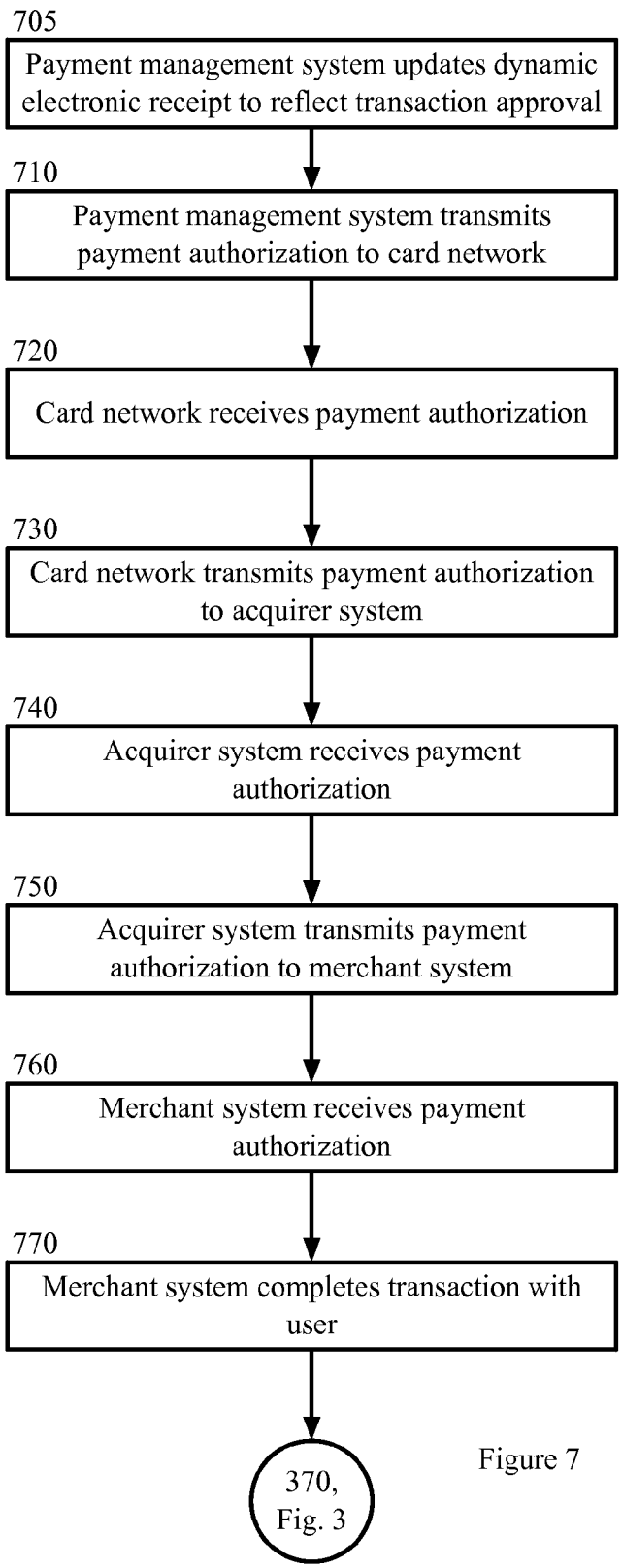
FIG. 7 is a block flow diagram depicting a method for transmitting a payment authorization to the merchant system for the fronting transaction, in accordance with certain example embodiments.

FIG. 7 is a block flow diagram depicting a method 360 for transmitting the payment authorization to the merchant system 110 for the fronting transaction, in accordance with certain example embodiments, as referenced in block 360. The method 360 is described with reference to the components illustrated in FIGS. 1 and 2.

In block 705, the payment management system 130 updates the dynamic electronic receipt to reflect approval of the purchase request. Continuing with the previous example as illustrated in FIG. 19, the transaction is approved for the adjusted purchase request amount of $90 ($100 less the $10 offer) and the dynamic electronic receipt 3010 was updated to reflect the approved transaction.

Returning to FIG. 7, in block 710, the payment management system 130 transmits the payment authorization to the card network 140. In an example embodiment, the payment authorization corresponds to the payment request and is routed to the merchant system 110.

In block 720, the card network 140 receives the payment authorization.

In block 730, the card network 140 transmits the payment authorization to the acquirer system 150. In an example embodiment, the payment authorization comprises an identifier that allows the card network 140 to route the payment request the acquirer system 150.

In block 740, the acquirer system 150 receives the payment authorization.

In block 750, the acquirer system 150 transmits the payment authorization to the merchant system 110. In an example embodiment, the payment authorization comprises an identifier that allows the acquirer system 150 to route the payment authorization to the merchant system 110.

In block 760, the merchant system 110 receives the payment authorization.

In block 770, the merchant system 110 completes the purchase transaction with the user 101. In an example embodiment, this completes the front transaction, as depicted on FIG. 2.

Returning to FIG. 7, from block 770, the method 360 proceeds to block 370 in FIG. 3.

Returning to FIG. 3, in block 370 the payment management system 130 determines a funding account for the purchase transaction. In an example embodiment, this signifies the beginning of the funding transaction, as depicted on FIG. 2. In an example embodiment, a window of time has passed between the completion of the fronting transaction, as previously described, and the funding transaction (for example, 1 minute, 10 minutes, 1 hour, 2 days, or another defined period of time). The method for determining the funding account for the funding transaction is described in more detail hereinafter with reference to the methods described in FIG. 8.

Figure 8:
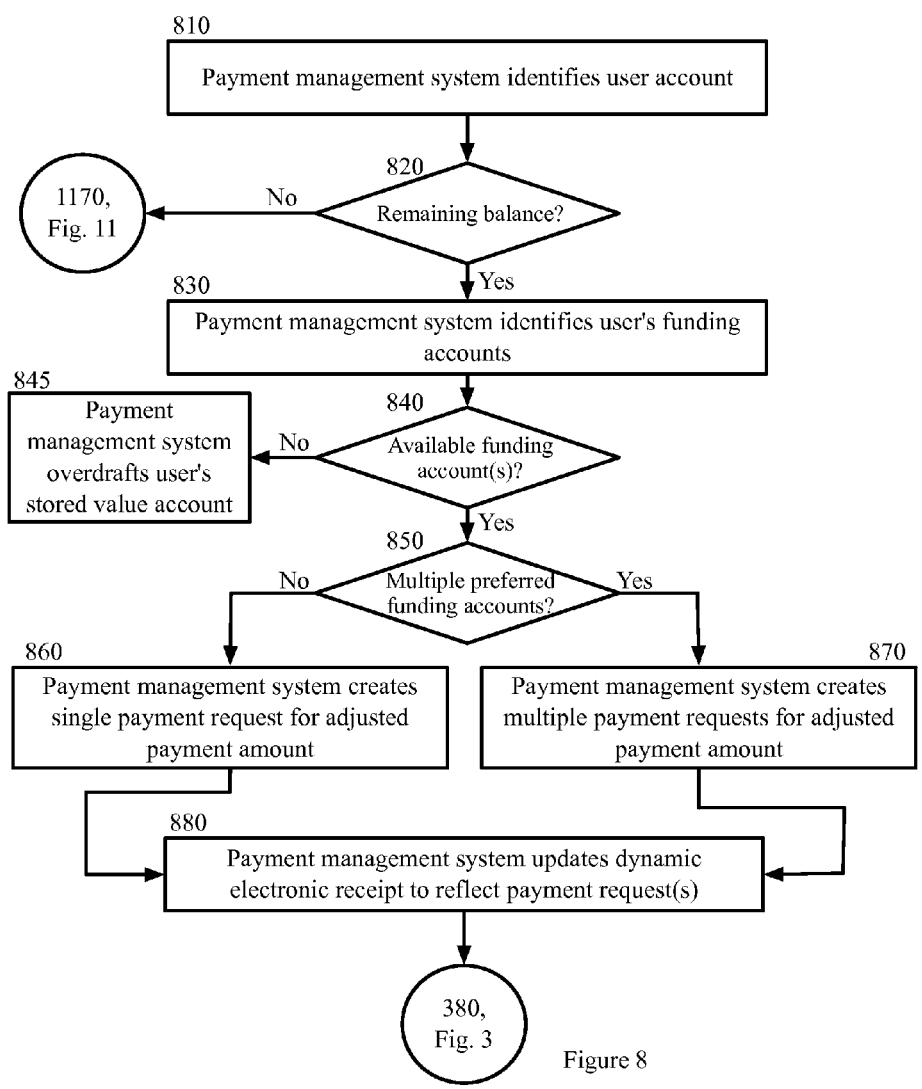
FIG. 8 is a block flow diagram depicting a method for determining a funding account for a funding transaction, in accordance with certain example embodiments.

FIG. 8 is a block flow diagram depicting a method 370 for determining the funding account for the funding transaction, in accordance with certain example embodiments, as referenced in block 370. The method 370 is described with reference to the components illustrated in FIGS. 1 and 2.

In block 810, the payment management system 130 identifies the user's 101 payment management system 130 account. In an example embodiment, the payment management system 130 reviews a log of approved transactions and identifies the user's payment management system 130 account from the list of approved transactions (for example, the log comprises a list of approved transaction for which a funding transaction has not been completed).

In block 820, the payment management system 130 determines whether there is a remaining balance for the funding transaction. In an example embodiment, the payment management system subtracts the amount deducted from the stored value account from the adjusted transaction amount. If the difference is not equal to zero, the payment management system 130 determines that a remaining balance exists for the funding transaction.

Figure 11:
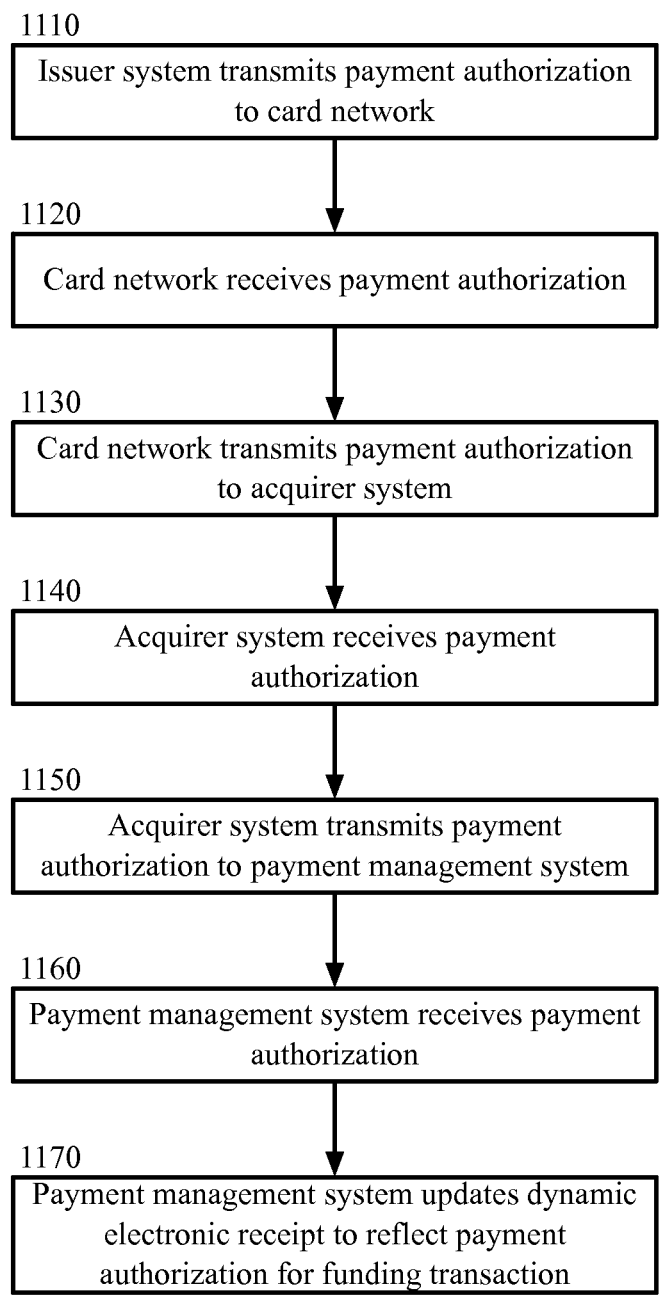
FIG. 11 is a block flow diagram depicting a method for transmitting a payment authorization notification for the funding transaction, in accordance with certain example embodiments.

If a remaining balance does not exist for the funding transaction, the method 370 proceeds to block 1170 in FIG. 11.

Returning to block 820, if a remaining balance does exist for the funding transaction, the method 370 proceeds to block 830.

In block 830, the payment management system 130 identifies the user's 101 funding account(s) available. In an example embodiment, the funding accounts have been previously designated by the user 101 when creating or updating the user's payment management system 130 account. In an example embodiment, the funding accounts are the one or more registered financial accounts previously described with reference to FIG. 3.

In block 840, the payment management system 130 determines whether the user 101 has additional funding accounts. In an example embodiment, the payment management system 130 determines whether the user 101 has one or more funding accounts in addition to the stored value account.

If the user 101 does not have additional funding accounts, the method 370 proceeds to block 845.

In block 845, the payment management system 130 overdrafts the user's 101 stored value account for the balance of the purchase transaction. In an example user's stored value account. The user 101 is notified of the overdraft status of the account and provided an opportunity to add funds to the stored value account.

Returning to block 840, if the user has additional funding accounts, the method 370 proceeds to block 850.

In block 850, the payment management system 130 determines whether the user 101 has identified multiple preferred funding accounts. In an example embodiment, the user 101 can designate one or more accounts as "preferred" funding accounts. In this embodiment, the payment management system 130 will select the one or more preferred funding accounts to finance the funding transaction. In an example embodiment, the user 101 can designate a preferred funding account when creating the payment management system 130 account or at any time prior to the beginning of the funding transaction. In another example embodiment, the user 101 designates one or more rules for selecting the preferred funding account (for example, select account B for a transaction with Merchant X). In yet another example embodiment, the payment management system 130 determines the funding account.

If the user 101 does not have multiple preferred funding accounts, the method 370 proceeds to block 860. In block 860, the payment management system 130 creates a single payment request for the adjusted payment amount. In an example embodiment, the adjusted payment amount is the amount from the payment request for the fronting transaction less an offers applied and less any amount paid from another account (for example, the stored value account).

From block 860, the method 370 proceeds to block 880.

Returning to block 850, if the user 101 has multiple preferred funding accounts, the method 370 proceeds to block 870. In block 870, the payment management system 130 creates multiple payment requests for the adjusted payment amount. In an example embodiment, the adjusted payment amount is the amount from the payment request for the fronting transaction less an offers applied and less any amount paid from another account (for example, the stored value account). In an example embodiment, the user 101 defines rules for determining the amount or percentage that will be charged to each funding account (for example, change 25% to preferred account A and the remainder to preferred account B). In another example embodiment, the payment management system 130 determines the amount that will be charged to each account (for example, $50 on a gift card with a $50 balance and the remainder on preferred account B).

In block 880, the payment management system 130 updates the dynamic electronic receipt to reflect the payment request(s). Continuing with the previous example as illustrated in FIG. 20, a payment request for $20 was submitted to the issuer system 160 of Account A, a payment request for $20 was submitted to the issuer system 160 of Account B and the dynamic electronic receipt 3010 was updated to reflect the payment requests.

Returning to FIG. 8, from block 880 the method 370 proceeds to block 380 in FIG. 3.

Returning to FIG. 3, in block 380 the payment management system 130 transmits the payment request for the funding transaction. In an example embodiment, the payment request functions to seek approval for the funding transaction via the user's 101 financial account. In an example embodiment, the payment management system 130 processes the funding transaction in a manner consistent with a typical debit card or credit card transaction. The method for transmitting the payment authorization request for the funding transaction is described in more detail hereinafter with reference to the methods described in FIG. 9.

Figure 9:
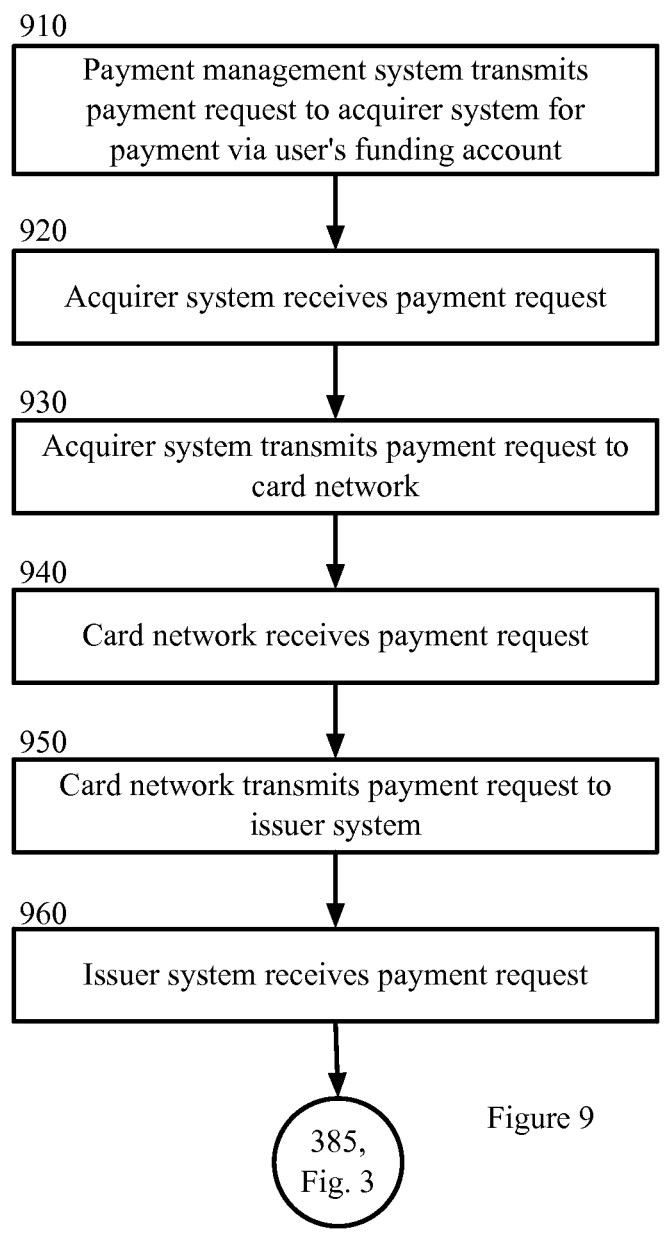
FIG. 9 is a block flow diagram depicting a method for transmitting a payment authorization request for the funding transaction, in accordance with certain example embodiments.

FIG. 9 is a block flow diagram depicting a method 380 for transmitting the payment authorization request for the funding transaction, in accordance with certain example embodiments, as referenced in block 380. The method 380 is described with reference to the components illustrated in FIGS. 1 and 2.

In block 910, the payment management system 130 transmits the payment request to the acquirer system 150.

In block 920, the acquirer system 150 receives the payment request. In an example embodiment, the acquirer system 150 receives the payment request in a manner consistent with a typical debit card or credit card transaction.

In block 930, the acquirer system 150 transmits the payment request to a card network 140. In an example embodiment, the acquirer system 150 transmits the payment request in a manner consistent with a typical debit card or credit card transaction.

In block 940, the card network 140 receives the payment request. In an example embodiment, the card network 140 receives the payment request in a manner consistent with a typical debit card or credit card transaction.

In block 950, the card network 140 transmits the payment request to the issuer system 160 that corresponds to the user's selected financial account. In an example embodiment, the account information can be read and understood by the card network 140, which allows the card network 140 to transmit the request to the issuer system 160. In this embodiment, the card network 140 reads an account number from the account information and determines, based on a series of numbers or routing information contained in the account number, that the payment request should be transmitted to the issuer system 160.

In block 960, the issuer system 160 receives the payment request.

In an example embodiment, the methods described in FIG. 9 are repeated for each funding account selected in block 890 of FIG. 8, if applicable.

The method 380 then proceeds to block 385 in FIG. 3.

Returning to FIG. 3, in block 385 the issuer system 160 approves or declines the transaction. In an example embodiment, the issuer system 160 determines if the user 101 has a sufficient available balance for the transaction.

If the transaction is not approved, the method 300 proceeds to block 390. In block 390, the payment management system 130 receives notification of the declined transaction. The method for transmitting a payment declination notification for the funding transaction, is described in more detail hereinafter with reference to the methods described in FIG. 10.

Figure 10:
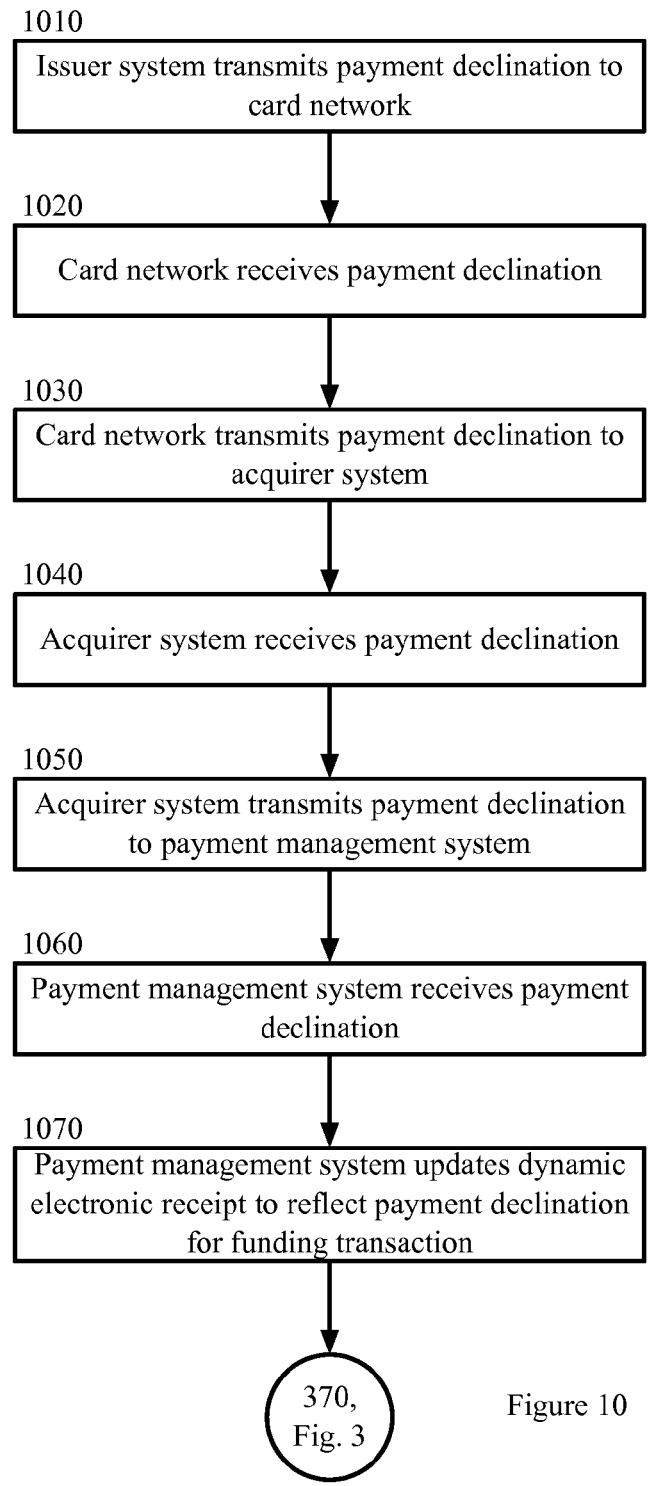
FIG. 10 is a block flow diagram depicting a method for transmitting a payment declination notification for the funding transaction, in accordance with certain example embodiments.

FIG. 10 is a block flow diagram depicting a method 390 for transmitting the payment declination notification for the funding transaction, in accordance with certain example embodiments, as referenced in block 390. The method 390 is described with reference to the components illustrated in FIGS. 1 and 2.

In block 1010, the issuer system 160 transmits the declination notice to the card network 140. In an example embodiment, the declination notice corresponds to the payment request and is routed to the payment management system 130.

In block 1020, the card network 140 receives the declination notice.

In block 1030, the card network 140 transmits the declination notice to the acquirer system 150. In an example embodiment, the declination notice comprises an identifier that allows the card network 140 to route the declination notice the acquirer system 150.

In block 1040, the acquirer system 150 receives the declination notice.

In block 1050, the acquirer system 150 transmits the declination notice to the payment management system 130. In an example embodiment, the declination notice comprises an identifier that allows the acquirer system 140 to route the declination notice to the payment management system 130.

In block 1060, the payment management system 130 receives the declination notice.

In block 1070, the payment management system 130 updates the dynamic electronic receipt to reflect the payment declination for the funding transaction. Continuing with the previous example as illustrated in FIG. 21, a declination notice that corresponds to the $20 payment request submitted to the issuer system 160 of Account A and the dynamic electronic receipt 3010 was updated to reflect the declination notice.

Returning to FIG. 10, from block 1070 the method 390 proceeds to block 370 in FIG. 3. In an example embodiment, the methods described in block 370 through 385 are repeated until the balance of the fronting transaction is paid (for example, until a payment authorization is received for the remaining balance or until the stored value account is overdraft for the remaining balance).

Returning to block 385 of FIG. 3, if the transaction is approved, the method 300 then proceeds to block 395. In block 395, the payment management system 130 receives a payment authorization for the funding transaction. The method for transmitting the payment authorization notification for the funding transaction is described in more detail hereinafter with reference to the methods described in FIG. 11.

FIG. 11 is a block flow diagram depicting a method 395 for transmitting the payment authorization notification for the funding transaction, in accordance with certain example embodiments, as referenced in block 395. The method 395 is described with reference to the components illustrated in FIGS. 1 and 2.

In block 1110, the issuer system 160 transmits the payment authorization to the card network 140. In an example embodiment, the payment authorization corresponds to the payment request and is routed to the payment management system 130.

In block 1120, the card network 140 receives the payment authorization.

In block 1130, the card network 140 transmits the payment authorization to the acquirer system 150. In an example embodiment, the payment authorization comprises an identifier that allows the card network 140 to route the payment authorization the acquirer system 150.

In block 1140, the acquirer system 150 receives the payment authorization.

In block 1150, the acquirer system 150 transmits the payment authorization to the payment management system 130. In an example embodiment, the payment authorization comprises an identifier that allows the acquirer system 140 to route the payment authorization to the payment management system 130.

In block 1160, the payment management system 130 receives the payment authorization.

In block 1170, the payment management system 130 updates the dynamic electronic receipt to reflect the payment authorization for the funding transaction. Continuing with the previous example as illustrated in FIG. 22, a payment authorization that corresponds to the $20 payment request submitted to the issuer system 160 of Account B and the dynamic electronic receipt 3010 was updated to reflect the payment authorization. In addition, a payment request for $20 was submitted to the issuer system 160 of Account C, a corresponding payment authorization was received, and the dynamic electronic receipt 3010 was updated to reflect the payment request and payment authorization.

Figure 12:
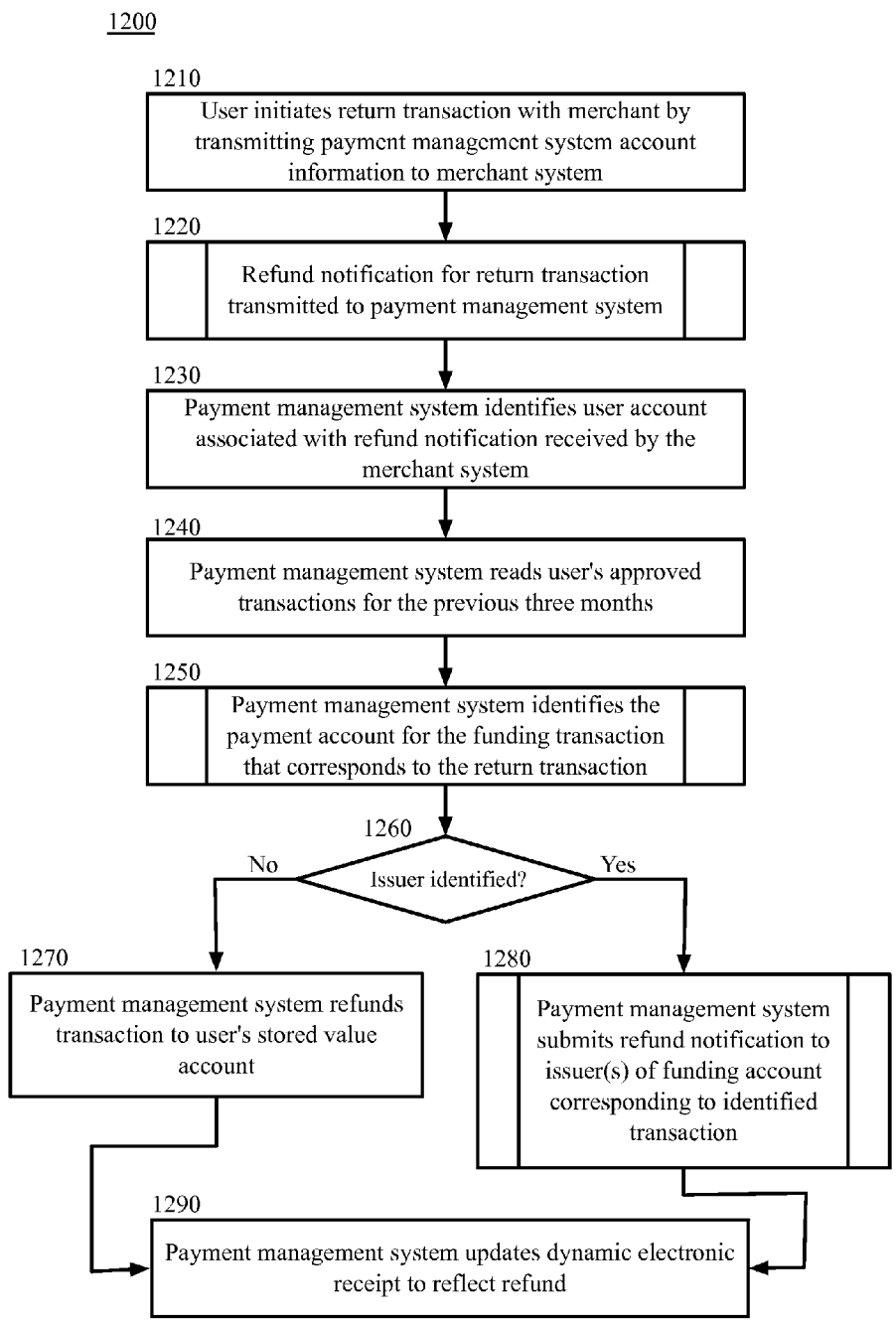
FIG. 12 is a block flow diagram depicting a method for processing a return transaction in the payment system, in accordance with certain example embodiments.

FIG. 12 is a block flow diagram depicting a method for processing a return transaction, in accordance with certain example embodiments. The method 1200 is described with reference to the components illustrated in FIGS. 1 and 2.

In block 1210, the user 101 initiates a return transaction with the merchant. In an example embodiment, the user 101 initiates a return transaction by taking a product back to a retail location or sending a product back to an online marketplace and presenting the user's 101 payment management system 130 account identifier.

In an example embodiment, the merchant system 110 operates an online marketplace and the user 101 enters the account identifier at the returns webpage or other suitable location. The merchant system 110 online marketplace provides a link, button, or other control that allows the user 101 to automatically transmit the user's payment management system 130 account information to the merchant system 110). In this embodiment, the user 101 is prompted to log into, has previously logged, or is otherwise automatically logged into the payment management system 130. In another example embodiment, the user's 101 login credentials are shared across other accounts (for example, social networking websites and user device 120 accounts) and the user 101 is automatically logged into the payment management system 140 account using the shared login credentials.

In another example embodiment, the merchant system 110 operates a retail store. In this embodiment, the user 101 may use the user account device 105 in a manner consistent with a magnetic stripe credit card. In another embodiment, a payment code is displayed on the user interface 121 of the user device 120 in a manner that the merchant system 110 and/or user 101 can read the code. In an example embodiment, the payment code is a bar code, QR code, or other machine-readable code that is capable of being scanned by a code scanner or otherwise readable by the merchant system 110. In another example embodiment, the payment code is displayed on the user interface 121 so that a merchant operating the merchant system 110 can read and physically enter the payment code into the POS terminal 115. In an alternative example embodiment, the payment code is read by the user 101 and entered into the POS terminal 115.

In another example embodiment, the user 101 using the user device 120 to initiate a contactless "tap" with the POS terminal 115. In operation of an NFC, Bluetooth, Wi-Fi, or other wireless transaction, the user 101 "taps" the user device 120, such as an NFC-enabled user device 120, to POS terminal 115 of a point of sale system. The POS terminal 115 recognizes the NFC-enabled device 120 when the device is moved within range of the POS terminal 115, establishes a secure communication channel with the device 120, and initiates a refund transaction between the POS terminal 115 and the device 120.

In block 1220, the merchant system 110 transmits a refund request for the return transaction to the account management system 130. In an example embodiment, the submission of the refund request by the merchant system 110 for the purchase transaction signifies the beginning of the fronting transaction as illustrated on FIG. 2. The refund request functions to seek approval for the return transaction via the account information provided by the user 101. In an example embodiment, the merchant system 110 processes the return transaction in a manner consistent with a typical debit card or credit card return transaction. The method for transmitting the return authorization request to the payment management system 130 for the fronting transaction is described in more detail hereinafter with reference to the methods described in FIG. 13.

FIG. 13 is a block flow diagram depicting a method 1200 for transmitting the refund notification to the payment management system 130, in accordance with certain example embodiments, as referenced in block 1220. The method 1220 is described with reference to the components illustrated in FIGS. 1 and 2.

In block 1310, the merchant system 110 generates a refund request message to request a refund using the account information provided by the user 101 in block 1210 and transmits the refund request to an acquirer system 150. In an example embodiment, the account information resembles actual debit/credit card information and the POS terminal 115 processes the transaction in a manner consistent with a typical refund request.

In block 1320, the acquirer system 150 receives the refund request. In an example embodiment, the acquirer system 150 receives the refund request in a manner consistent with a typical debit card or credit card refund transaction.

In block 1330, the acquirer system 150 transmits the refund request to a card network 140. In an example embodiment, the acquirer system 150 transmits the refund request in a manner consistent with a typical debit card or credit card refund transaction. In an example embodiment, the account information provided by the user 101 in block 1210 can be read and understood by the acquirer system 150, which allows the acquirer system 150 to transmit the request to the appropriate card network 140.

In block 1340, the card network receives the refund request. In an example embodiment, the card network receives the refund request in a manner consistent with a typical debit card or credit card refund transaction.

In block 1350, the card network 140 transmits the refund request to the payment management system 130. In an example embodiment, the account information provided by the user 101 in block 1210 can be read and understood by the card network 140, which allows the card network 140 to transmit the request to the payment management system 130. In this embodiment, the card network 140 reads an account number from the account information and determines, based on a series of numbers or routing information contained in the account number, that the refund request should be transmitted to the payment management system 130.

In block 1360, the payment management system 130 receives the refund request.

The method 1310 then proceeds to block 1230 in FIG. 12.

Returning to FIG. 12, in block 1230, the payment management system 130 identifies the user 101 account associated with the refund request received from the merchant system 110. In an example embodiment, the payment management system 130 uses the information contained in the refund request to identify the user's 101 account. In an example embodiment, the payment management system 130 reads the user's 101 account identification information from the refund request. In an example embodiment, the user's 101 identification information is contained in or encoded by the account information. In another example embodiment, the payment management system 130 cross-references a list of generated account numbers to determine the corresponding user 101 account.

In another example embodiment, the user 101 is conducting an online return transaction with the merchant system 110 or a transaction via a merchant shopping application 123 resident on the user device 120 and the user 101 is logged into the user's payment management system 130 account.

In block 1240, the payment management system 130 reads the user's 101 approved transaction for the previous three months. In an example embodiment, a log of the user's approved transactions is maintained in the user's 101 payment management system 130 account such that the system 130 can retrieve and review a list of the previous transactions when processing the return. In another example embodiment, the payment management system retrieves and reviews the dynamic electronic receipts maintained in the user's payment management system 130 account to locate the user's previous transactions when processing the return.

In block 1250, the payment management system 130 identifies the payment account for the funding transaction that corresponds to the return transaction. In an example embodiment, the payment management system 130 funds the return transaction to the same account or accounts in which the original payment transaction was funded by. In this example, the return transaction is applied to the funding accounts in reverse order to that in which the funding transaction was applied. For example, continuing with the previous example described with reference to FIG. 22, the payment management system 130 would fund $20 of the refund to Account C, then $20 to Account B, and finally $50 to the Stored Value Account. The method for identifying the payment account for the funding transaction that corresponds to the return transaction is described in more detail hereinafter with reference to the methods described in FIG. 14.

Figure 14:
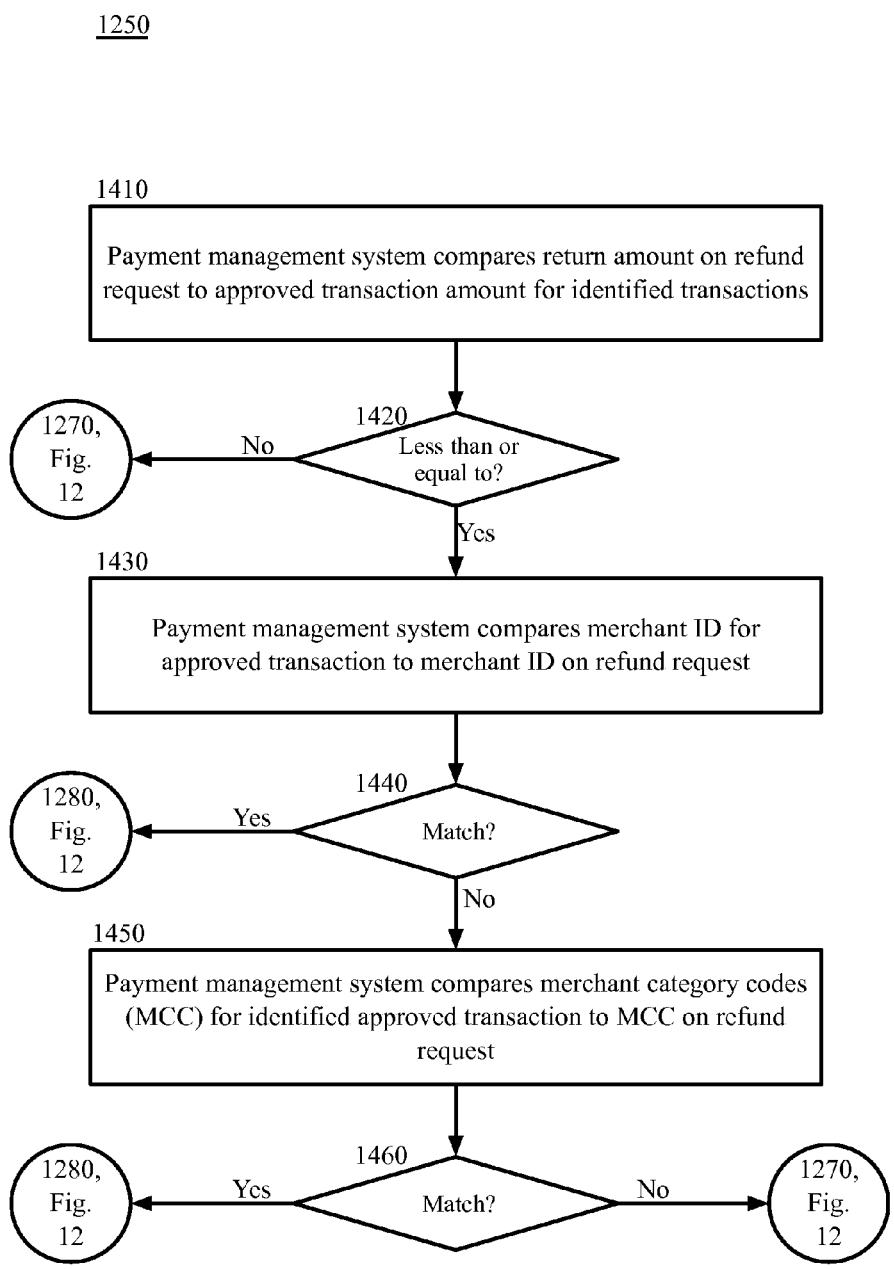
FIG. 14 is a block flow diagram depicting a method for identifying a payment account for the funding transaction that corresponds to the return transaction, in accordance with certain example embodiments.

FIG. 14 is a block flow diagram depicting a method 1250 for identifying the payment account for the funding transaction that corresponds to the return transaction, in accordance with certain example embodiments, as referenced in block 1250. The method 1250 is described with reference to the components illustrated in FIGS. 1 and 2.

In block 1410, the payment management system 130 compares the return amount of the refund request to the approved transaction amount for the identified transactions for the previous three months. In an example embodiment, the payment management system 130 reviews the transaction approval amount designated for each funding transaction and compares that amount to the refund amount on the refund request.

In block 1420, the payment management system 130 determines whether the refund amount is less than or equal to the transaction approval amount designated for each of the identified funding transactions. In an example embodiment, a refund transaction is for an item or portion of the purchase transaction. In this embodiment, the amount of the refund request is less than the transaction approval amount designated for the funding transaction. In another example embodiment, the refund transaction is for the entire purchase transaction. In this embodiment, the amount of the refund is equal to the transaction approval amount designated for the funding transaction. In an example embodiment, the payment management system 130 compares these amounts to make the determination.

If the refund amount is not less than or equal to the transaction approval amount designated for any of the identified funding transactions, the method 1350 proceeds to block 1270 in FIG. 12.

Returning to block 1420, if the refund amount is less than or equal to the transaction approval amount designated for any of the identified funding transactions, the method 1350 proceeds to block 1430.

In block 1430, the payment management system 130 compares the merchant identification (ID) code for the approved transaction to the merchant ID code on the refund request. In an example embodiment, the payment management system 130 reads the merchant ID code from the refund request and cross-references the code to the merchant ID codes of known merchant systems to identify the merchant system 110. In an example embodiment, the merchant system 110 has previously provided the payment management system 130 with a merchant's ID code (for example, when registering with the payment management system 130, when providing the payment management system 130 offers for distribution, or when otherwise conducting business with the payment management system 130).

In another example embodiment, the refund request does not contain the merchant ID and the payment management system 130 reads a merchant descriptor from the refund request. In an example embodiment, the payment request comprises the merchant ID code and/or a descriptor that identifies the merchant system 110. The merchant descriptor comprises a name or other descriptor that identifies the merchant system 110. In an example embodiment, the descriptor can comprise an identification of a branch, franchise, or division of a merchant system (for example, a fast food restaurant franchise located on street X in town Z). The payment management system 130 identifies the merchant system 110 based on the merchant descriptor read from the refund request.

In block 1440, the payment management system 130 determines whether the merchant ID code from the refund request corresponds to the merchant ID code from the identified transactions. In an example embodiment, the merchant ID code is available and the payment management system 130 compares the merchant ID code provided in the payment request to the merchant ID code for the identified purchase transactions. In another example embodiment, the payment management system 130 compares the merchant descriptor to the merchant descriptor and/or merchant ID provided in the identified purchase transactions.

If the merchant ID codes do not match, the method 1350 proceeds to block 1280 in FIG. 12.

Returning to block 1440, if the merchant ID codes do match, the method 1350 proceeds to block 1450. In block 1450, the payment management system comparers the merchant category codes (MCC) on the refund request to the MCC on the identified transactions. In an example embodiment, the MCC classifies the merchant system 110 by the type of goods and/or services provided. This allows the issuer system 160 to provide rewards based on types of purchases, provide users 101 with feedback regarding the types of goods/services purchased, or to provide a spending analysis. In an example embodiment, the MCC are provided on the fronting transaction purchase request and are recorded on the dynamic electronic receipt and/or another record of the transaction.

In block 1460, the payment management system 130 determines whether the MCC from the refund request matches the MCC from the identified transactions. In an example embodiment, the payment management system cross-references the codes to determine if they match.

If the codes do not match, the method 1350 proceeds to block 1270 in FIG. 12.

Returning to block 1460, if the MCC match, the method 1350 proceeds to block 1280 in FIG. 12.

In an example embodiment, the methods described in FIG. 14 can be performed in any order. For example, the payment management system 130 may compare the transaction amounts pursuant to the methods described in blocks 1410-1420 and then compare the MCC pursuant to the methods described in block 1450-1460.

In another example embodiment, the payment management system 130 may employ any other form of logic to determine the original funding account. For example, if the user 101 has only a single funding account, the payment management system 130 will identify that account, or if the user 101 has only performed a single transaction, the payment management system 130 will identify that account.

The method 1350 then proceeds to block 1260 in FIG. 12.

In block 1260, the payment management system 130 determines whether the payment account corresponding the original funding transaction was identified and identifies the issuer system 160 that corresponds to that payment account. In an example embodiment, the corresponding payment account is identified pursuant to the methods described with reference to FIG. 13.

If the corresponding payment account and issuer system 160 were not identified, the method 1200 proceeds to block 1270. In block 1270, the payment management system 130 refunds the refund transaction amount to the user's 101 stored value account. In an example embodiment, the payment management system 130 is the issuer system 160 that maintains the user's 101 stored value account. In another example embodiment, a third party system maintains the user's 101 stored value account and the payment management system 130 submits a refund notification to the issuer system 160 of the stored value account pursuant to the methods described with reference to block 1280 in FIG. 12.

Returning to block 1260, if the corresponding payment account and issuer system 160 were identified, the method 1200 proceeds to block 1280. In block 1280, the payment management system 130 submits a refund notification to the issuer system(s) 160 of the identified funding account. The method for transmitting the refund notification to the issuer system 160 of the payment account for the funding transaction that corresponds to the return transaction is described in more detail hereinafter with reference to the methods described in FIG. 15.

Figure 15:
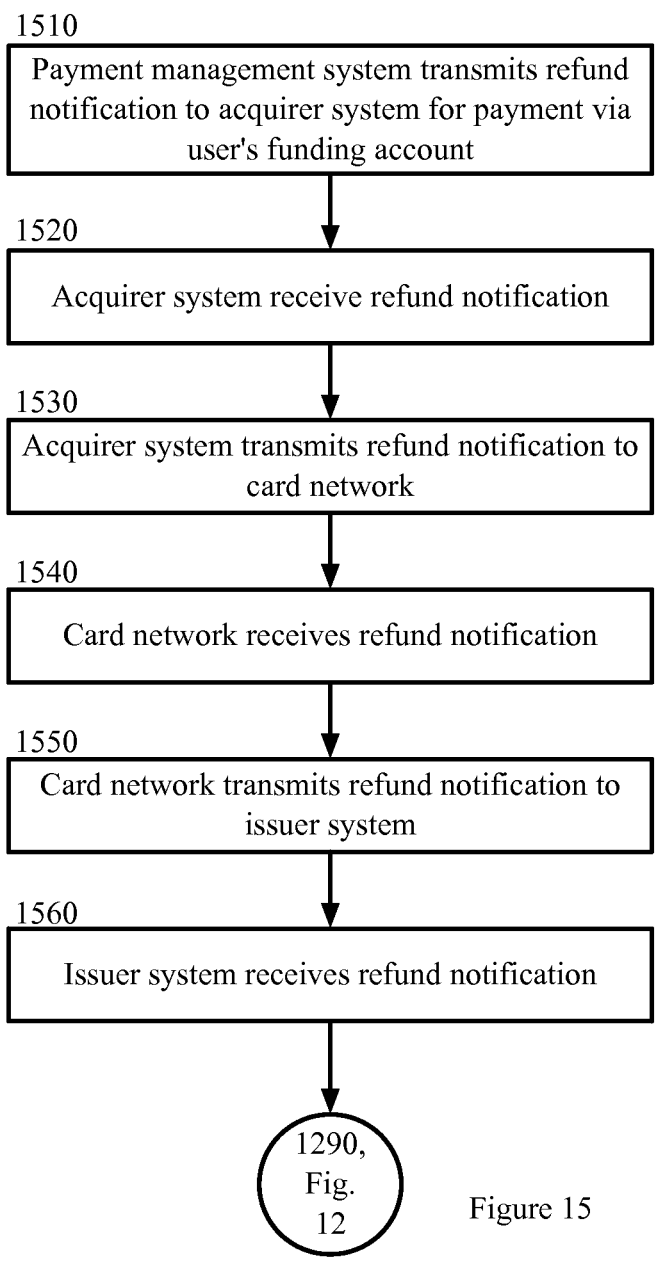
FIG. 15 is a block flow diagram depicting a method for transmitting a refund notification to an issuer of the payment account for the funding transaction that corresponds to the return transaction, in accordance with certain example embodiments.

FIG. 15 is a block flow diagram depicting a method 1280 for transmitting the refund notification to the issuer system 160 of the payment account for the funding transaction that corresponds to the return transaction, in accordance with certain example embodiments, as referenced in block 1280. The method 1280 is described with reference to the components illustrated in FIGS. 1 and 2.

In block 1510, the payment management system 130 transmits the refund request to the acquirer system 150.

In block 1520, the acquirer system 150 receives the refund request. In an example embodiment, the acquirer system 150 receives the refund request in a manner consistent with a typical debit card or credit card refund transaction.

In block 1530, the acquirer system 150 transmits the refund request to a card network 140. In an example embodiment, the acquirer system 150 transmits the refund request in a manner consistent with a typical debit card or credit card refund transaction.

In block 1540, the card network 140 receives the refund request. In an example embodiment, the card network 140 receives the refund request in a manner consistent with a typical debit card or credit card refund transaction.

In block 1540, the card network 140 transmits the refund request to the issuer system 160 that corresponds to the user's selected financial account. In an example embodiment, the account information can be read and understood by the card network 140, which allows the card network 140 to transmit the request to the issuer system 160. In this embodiment, the card network 140 reads an account number from the account information and determines, based on a series of numbers or routing information contained in the account number, that the refund request should be transmitted to the issuer system 160.

In block 1560, the issuer system 160 receives the refund request.

In an example embodiment, the methods described in FIG. 15 are repeated for each funding account identified in block 1260 of FIG. 12, if applicable.

The method 1280 then proceeds to block 1290 in FIG. 12.

Returning to FIG. 12, in block 1290, the payment management system updates the dynamic electronic receipt to reflect the refund. Continuing with the previous example as illustrated in FIG. 23, a refund request that corresponds to the $20 payment request was submitted to the issuer system 160 of Account C and the dynamic electronic receipt 3010 was updated to reflect the refund request. In addition, a refund request for $20 was submitted to the issuer system 160 of Account B and the dynamic electronic receipt 3010 was updated to reflect the refund request. Finally, a refund to the user's 101 Stored Value Account for $50 was processed and the dynamic electronic receipt 3010 was updated to reflect the refund.

Other Example Embodiments

Figure 16:
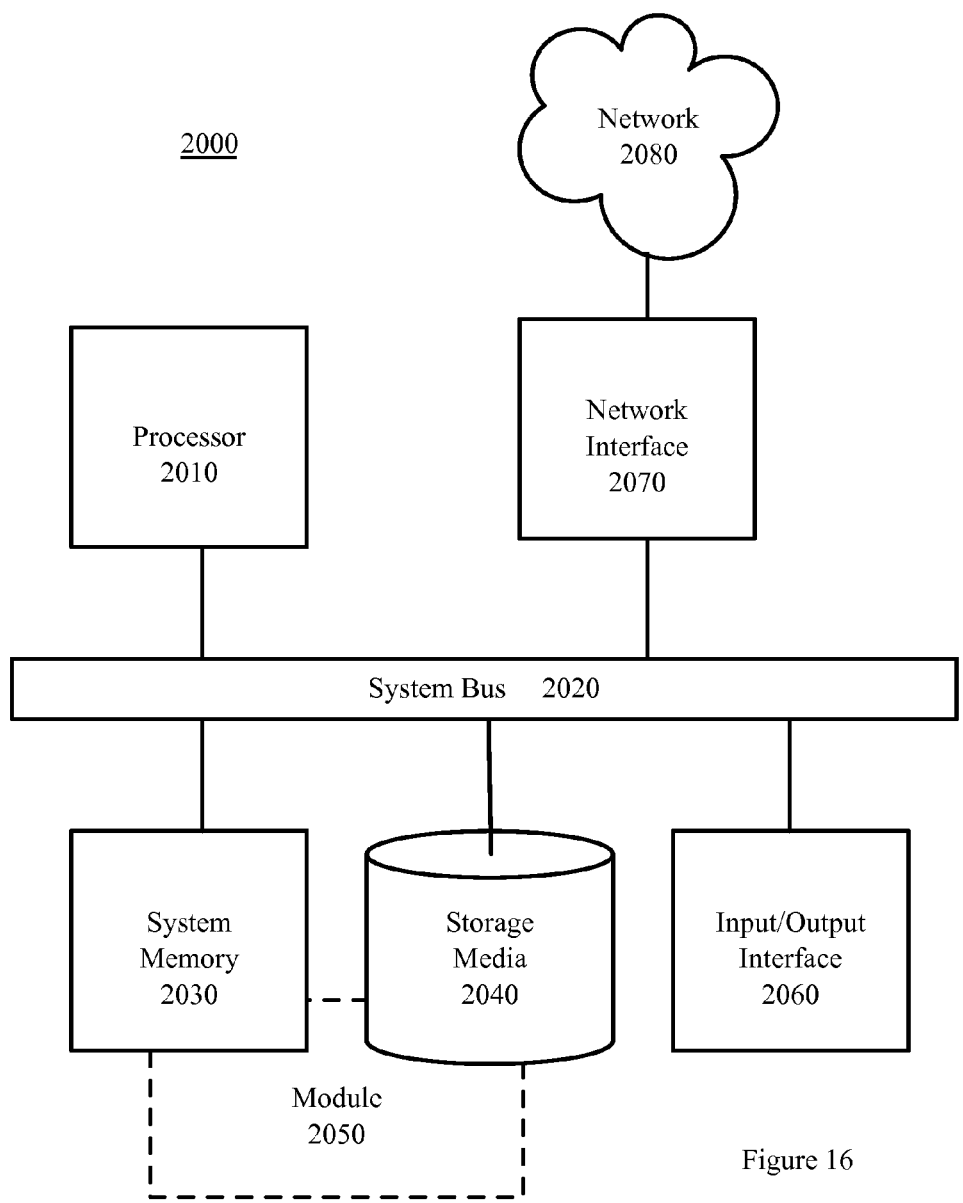
FIG. 16 is a block diagram depicting a computer machine and module, in accordance with certain example embodiments.

FIG. 16 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory (ROM), programmable read-only memory (PROM), erasable programmable read-only memory (EPROM), flash memory, or any other device capable of storing program instructions or data with or without applied power. The system memory 2030 may also include volatile memories such as random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip (SOC), system on package (SOP), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to process split tender purchase transactions utilizing delayed processing windows, comprising:
    receiving, by a payment management computing system, a merchant payment request from a merchant system, the merchant payment request comprising an account identifier for a user account maintained by the payment management computing system and a transaction value;
    determining, by the payment management computing system, the user account that corresponds to the account identifier, the user account having one or more financial accounts associated therewith;
    prior to determining which of the one or more financial accounts associated with the user account and prior to determining that sufficient funds are available to support the transaction value:
        determining, by the payment management computing system, to approve the merchant payment request based at least in part on a risk analysis; and
        transmitting, by the payment management computing system, a merchant payment authorization to the merchant system; and
    at a time after transmitting the merchant payment authorization:
        determining, by the payment management computing system, which first one of the one or more financial accounts associated with the user account from which to request a first funding payment for a first portion of the transaction value;
        submitting, by the payment management computing system, a first funding payment request to a first issuer computing system for the first portion of the transaction value after determining the first financial account for submission of the first funding payment request;
        determining, by the payment management computing system, which second one of the one or more financial accounts associated with the user account from which to request a second funding payment for a second portion of the transaction value; and
        submitting, by the payment management computing system, a second funding payment request to a second issuer computing system for the second portion of the transaction value after determining the second financial account for submission of the second funding payment request.

2. The computer-implemented method of claim 1, wherein determining which first one of the one or more financial accounts associated with the user account from which to request the first funding payment for a first portion of the transaction value comprises:
    identifying, by the payment management computing system, a stored value account balance, wherein the stored value account is maintained by the payment management system; and
    for an account balance of the stored value account greater than zero, deducting, by the payment management computing system, a portion of the transaction value from the balance, wherein a resulting balance is greater than or equal to zero.

3. The computer-implemented method of claim 2, wherein the resulting balance is zero and further comprising identifying, by the payment management computing system, one or more rules associated with the one or more financial accounts associated with the user account, wherein the one or more rules comprise an identification of one or more preferred funding accounts.

4. The computer-implemented method of claim 1, wherein the second funding request is submitted to the second issuer computing system prior to receiving a first payment notification from the first issuer computing system.

5. The computer-implemented method of claim 1, wherein the user's one or more financial accounts comprise bank accounts, debit accounts, credit accounts, gift accounts, or loyalty rewards accounts.

6. The computer-implemented method of claim 1, wherein the account identifier comprises an account number, proxy account number, user account device, magnetic stripe card, bar code, or QR code that corresponds to the user's payment management computing system account and can be understood to route the merchant payment request to the payment management computing system.

7. The computer-implemented method of claim 1, wherein determining to approve the merchant payment request comprises executing an algorithm or a logic program to determine to approve the payment request without receiving notification of an approved transaction indicating that sufficient funds are available to authorize the first or second funding payment request.

8. The computer-implemented method of claim 1, further comprising, receiving, by the payment management computing system, approval of the first funding payment request and approval of the second funding payment request.

9. A computer program product, comprising:
a non-transitory computer-readable medium having computer-executable program instructions embodied therein that when executed by a computer cause the computer to process split tender purchase transactions utilizing delayed processing windows, the computer-executable program instructions comprising:
computer-executable program instructions to receive a merchant payment request from a merchant system, the merchant payment request comprising an account identifier for a user account maintained by a payment management system and a transaction value;
computer-executable program instructions to determine the user account that corresponds to the account identifier;
computer-executable program instructions to determine to approve the merchant payment request prior to determining which of one or more financial accounts associated with the user account from which to request a funding payment for at least a portion of the transaction value and prior to determining that sufficient funds are available to support the transaction value;
computer-executable program instructions to transmit a merchant payment authorization to the one or more computing devices operated by the merchant system based on determining to approve the merchant payment;
computer-executable program instructions to, at a time after transmitting the merchant payment authorization, determine which first one of the one or more financial accounts associated with the user account from which to request a first funding payment for a first portion of the transaction value and determine which second one of the one or more financial accounts associated with the user account from which request for a second funding payment for a second portion of the transaction value;
computer-executable program instructions to submit a first funding payment request to a first issuer computing system for the first portion of the transaction value after determining the first financial account for submission of the first funding payment request; and
computer-executable program instructions to submit a second funding payment request to a second issuer computing system for the second portion of the transaction value after determining the second financial account for submission of the second funding payment request.

10. The computer program product of claim 9, wherein computer-executable instructions to determine from which first one of the one or more financial accounts associate with the user account from which to request the first funding payment for the first portion of the transaction value comprises:
computer-executable program instructions to identify a stored value account balance, wherein the stored value account is maintained by the payment management system; and
computer-executable program instructions to, for an account balance of the stored value account greater than zero, deduct a portion of the transaction value from the balance, wherein a resulting balance is greater than or equal to zero.

11. The computer program product of claim 9, wherein the second funding request is submitted to the second issuer computing system prior to receiving a first payment notification from the first issuer computing system.

12. The computer program product of claim 9, wherein the one or more financial accounts comprise bank accounts, debit accounts, credit accounts, gift accounts, or loyalty rewards accounts.

13. The computer program product of claim 9, wherein determining to approve the merchant payment request comprises executing an algorithm or a logic program to determine to approve the payment request without receiving notification of an approved transaction indicating that sufficient funds are available to authorize the first or second funding payment request.

14. The computer program product of claim 9, further comprising computer-readable program instructions to receive approval of the first funding payment request and approval of the second funding payment request.

15. A system to process split tender purchase transactions utilizing delayed processing windows, comprising:
a storage medium; and
a processor communicatively coupled to the storage medium, wherein the processor executes application code instructions that are stored in the storage medium to cause the system to:
receive a merchant payment request from a merchant system, the merchant payment request comprising an account identifier for a user account maintained by a payment management system and a transaction value;
determine the user account that corresponds to the account identifier;
prior to determining which of one or more user financial accounts associated with the user account maintained by the payment management system from which to request a funding payment for at least a portion of the transaction value and prior to determining that sufficient funds are available to support the transaction value, determine to approve the merchant payment request;
transmit a merchant payment authorization to the one or more computing devices operated by the merchant system based on determining to approve the merchant payment;
at a time after transmitting the merchant payment authorization, determine which first one of the one or more financial accounts associated with the user account from which to request a first funding payment for a first portion of the transaction value and determine which second one of the one or more financial accounts associated with the user account from which to request a second funding payment for a second portion of the transaction value;

submit a first funding payment request to a first issuer computing system for the first portion of the transaction value after determining the first financial account for submission of the first funding payment request; and submit a second funding payment request to a second issuer computing system for the second portion of the transaction value after determining that first financial account for submission of the second funding payment request.

16. The system of claim 15, wherein determining which first one of the one or more financial accounts associated with the user account from which to request the first funding payment for the first portion of the transaction value further comprises application code instructions stored in the storage medium to cause the system to:

identify a stored value account balance, wherein the stored value account is maintained by the payment management system; and for an account balance of the stored value account greater than zero, deduct a portion of the transaction value from the balance, wherein a resulting balance is greater than or equal to zero.

17. The system of claim 15, wherein the second funding request is submitted to the second issuer computing system prior to receiving a first payment notification from the first issuer computing system.

18. The system of claim 15, wherein the user's one or more financial accounts comprise bank accounts, debit accounts, credit accounts, gift accounts, or loyalty rewards accounts.

19. The system of claim 15, wherein determining to approve the merchant payment request comprises executing an algorithm or a logic program to determine to approve the payment request without receiving notification of an approved transaction indicating that sufficient funds are available to authorize the first or second funding payment request.

20. The system of claim 15, wherein the processor is further configured to execute computer-executable instructions stored in the storage medium to cause the system to receiving approval of the first funding payment request and approval of the second funding request.

* * * * *